United States Patent
Ito et al.

(10) Patent No.: US 8,339,412 B2
(45) Date of Patent: Dec. 25, 2012

(54) VIDEO PROCESSING DEVICE, RECORDING MEDIUM, VIDEO SIGNAL PROCESSING METHOD, VIDEO SIGNAL PROCESSING PROGRAM, AND INTEGRATED CIRCUIT

(75) Inventors: Takeshi Ito, Osaka (JP); Katsuhiro Kanamori, Nara (JP); Haruo Yamashita, Osaka (JP); Satoshi Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 1004 days.

(21) Appl. No.: 12/298,388

(22) PCT Filed: Mar. 20, 2007

(86) PCT No.: PCT/JP2007/055699
§ 371 (c)(1),
(2), (4) Date: Oct. 24, 2008

(87) PCT Pub. No.: WO2007/125697
PCT Pub. Date: Nov. 8, 2007

(65) Prior Publication Data
US 2010/0135634 A1    Jun. 3, 2010

(30) Foreign Application Priority Data
Apr. 26, 2006  (JP) .................................. 2006-122631

(51) Int. Cl.
*G09G 5/02* (2006.01)
(52) U.S. Cl. ........ 345/590; 345/589; 345/591; 345/600; 382/162; 382/167; 382/168
(58) Field of Classification Search .................. None
See application file for complete search history.

(56) References Cited

U.S. PATENT DOCUMENTS

| | | | |
|---|---|---|---|
| 6,157,735 A * | 12/2000 | Holub | 382/167 |
| 6,650,437 B1 * | 11/2003 | Nakajima | 358/1.9 |
| 7,916,202 B2 * | 3/2011 | Suenaga et al. | 348/333.11 |
| 2002/0044756 A1 | 4/2002 | Ishii | |
| 2004/0119843 A1 | 6/2004 | Hoshuyama | |
| 2004/0246526 A1 | 12/2004 | Ishigami et al. | |
| 2005/0122410 A1 | 6/2005 | Hattori | |

(Continued)

FOREIGN PATENT DOCUMENTS

JP    10-191388    7/1998

(Continued)

OTHER PUBLICATIONS

International Search Report issued Jun. 26, 2007 in the International (PCT) Application No. PCT/JP2007/055699.

(Continued)

*Primary Examiner* — Antonio A Caschera
(74) *Attorney, Agent, or Firm* — Wenderoth, Lind & Ponack, L.L.P.

(57) ABSTRACT

It is possible to realize a novel video processing device that can utilize the compatibility between the spaces of an encoded image in an xvYCC system with a wide color gamut and an encoded image in the conventional YCbCr system. The video signal processing device detects the type of the recording medium with a video medium type detection portion, obtains the color gamut of the video signal with a video color gamut obtaining portion, determines a color adjustment parameter with a color adjustment parameter determining portion, performs color adjustment on the video signal with a video color adjustment portion based on that parameter, records the color-adjusted video signal to the recording medium.

16 Claims, 14 Drawing Sheets

U.S. PATENT DOCUMENTS

| | | |
|---|---|---|
| 2006/0146196 A1 | 7/2006 | Suenaga |
| 2008/0246855 A1 | 10/2008 | Hoshuyama |
| 2011/0141302 A1 | 6/2011 | Hoshuyama |
| 2011/0150333 A1 | 6/2011 | Suenaga |

FOREIGN PATENT DOCUMENTS

| | | |
|---|---|---|
| JP | 11-243529 | 9/1999 |
| JP | 2001-024975 | 1/2001 |
| JP | 2001-136487 | 5/2001 |
| JP | 2003-153025 | 5/2003 |
| JP | 2004-96400 | 3/2004 |
| JP | 2004-193754 | 7/2004 |
| JP | 2004-200902 | 7/2004 |
| JP | 2005-86737 | 3/2005 |
| JP | 2005-192197 | 7/2005 |
| WO | 2004-077837 | 9/2004 |

OTHER PUBLICATIONS

IEC_TC100/TA2_61966-2-4: Multimedia systems and equipment—Colour measurement and management—Part 2-4: Colour management—Extended-gamut YCC colour space for video applications—xvYCC (TA2) (100/967/CDV) May 6, 2005.

* cited by examiner

| Code | CS (Color Space) |
|---|---|
| 0 | YCbCr (BT709-YCbCr color gamut) |
| 1 | xvYCC |
| | ...... |

| Code | IST (Image State) |
|---|---|
| 0 | color adjustment no |
| 1 | color adjustment yes |
| | ...... |

| Code | CMP |
|---|---|
| 0 | no compression |
| n | compression of chroma direction to factor of n |

FIG. 7

VIDEO PROCESSING DEVICE, RECORDING MEDIUM, VIDEO SIGNAL PROCESSING METHOD, VIDEO SIGNAL PROCESSING PROGRAM, AND INTEGRATED CIRCUIT

TECHNICAL FIELD

The present invention relates to devices and to a color encoding method and a color processing method in a standard color space for video.

BACKGROUND ART

Two standards are known for the color space of digital video signals. These are ITU-R BT.601 and ITU-R BT.709, which are specified by the ITU-R (International Telecommunication Unit, Radiocommunication Bureau). For example, an RGB signal that is captured by a camera is converted to a YCbCr signal, which is a signal of the luminance and the chroma, and recorded and transmitted, and in the display is reconverted to an RGB signal and the color and tone (grayscale) are reproduced. Here, the RGB signal can be expressed in a three-dimensional color space that is specified by the non-linear primary colors R, Gy and B (0 to 1) that are obtained by processing with a gamma value for gamma correction of approximately 1/2.2.

On the other hand, compared to this non-linear RGB signal, the YCbCr signal is specified such that the Y signal, which is the luminance, of the YCbCr signal ranges from 0 to 1. Next, the two chroma signals Cr and Cb are defined in terms of R-Y and B-Y, respectively, and the range that these chroma signals can take is specified to a range with a minimum value and a maximum value of (−0.5 to 0.5) so as to just contain a RGB color three-dimensional object. The signal values that are specified by values from 0 to 1 are encoded to an 8-bit digital value, but not all values (0 to 255) in 8 bits can be taken for the Y signal, the Cr signal, and the Cb signal. This is because a margin must be secured in order to reliably perform various processing using the video signal (moving picture). In practice, the offset value and the gain are set so that the dynamic range of the Y signal is a value in the range of 16 to 235, and so that the Cr signal and the Cb signal have a colorless gray value of 128 and the dynamic range is a value from 16 to 240.

Consequently, the colors in 8-bit conventional digital video signals are in the range of 16 to 235 for the Y signal and 16 to 240 for the Cr signal and the Cb signal, and thus video device hardware and software for handling video executed processing on all signals in this range.

To provide a more detailed explanation, the actual Y signal, Cr signal, and Cb signal are limited to the above ranges, and furthermore only colors that are within the RGB (0 to 1) space corresponding to the signal are defined. If the signals are to be converted to RGB, then those YCbCr signals that correspond to regions where the converted RGB values are negative or greater than 1 would in practice not be defined, even if they could exist.

The color gamut with a Y signal value of 16 to 235 and Cr signal and Cb signal values of 16 to 240, in which the RGB values that correspond to the YCbCr values are within a space from 0 to 1, is referred to as the BT709-RGB color gamut, and that color space is referred to as the BT709-RGB color space. Reference numeral 201 in FIG. 2 indicates a BT709-RGB color gamut.

In recent years, devices known as extended color gamut displays that can express colors beyond the conventional RGB space, particularly liquid crystal displays for reproducing video, have entered the market. For example, liquid crystal TVs that use an LED backlight with three or six primary colors have been released, and these are furnished with a display that can express the colors of a color gamut that exceeds the conventional color gamut, some even being furnished with a display that can express 95% or more of the surface colors in the natural environment. These devices are intended for commercial sale, and thus the video source that is input is a conventional video standard based on ITU-R BT.601 and ITU-R BT.709. This leads to the problem that the features of the extended color gamut display cannot be taken advantage of because the only color range that is available for expression is the conventional BT709-RGB space.

Accordingly, a color space encoding method that can maintain continuity with the conventional standard while allowing for expression of an extended color gamut by also using regions outside of the BT709-RGB color space that conventionally have not been used, has been proposed as xvYCC and steps toward standardization are underway. The xvYCC color space maintains compatibility with conventional ITU-R BT.601 and ITU-R BT.709 while broadening the color space. Consequently, it is possible to record, for example, digital video signals within the xvYCC color space without changing encoders or decoders for the conventional video format or MPEG and the like, or media standard of DVDs and the like. Further, the xvYCC color space is an extended color gamut space and thus it is possible to record video capturing an object that has a wide color gamut, such as the negatives of color photographs, and video in which color adjustment or the like has been performed using a wide color gamut, as is without loss.

Conventionally, various types of color correction processing have been executed in order to make captured color video appear prettier, but the RGB range is quickly exceeded when such processing is performed, making it impossible to feel the effect of the wide-band color reproduction. Using the xvYCC color space, which has a wide color space, allows for the expression of colors that heretofore could not be reproduced, and thus it is envisioned that the color adjustment (color editing), etc., of color images will be exploited more than ever before, allowing the effect of wide color reproduction to be experienced on wide-color-gamut TVs and impressing many people.

However, if color editing is performed assuming an xvYCC color space in video that has been captured or color video that is created on a computer, and then that color-adjusted signal is transmitted, then the current status of that transmitted signal will be unclear, and as a result it is conceivable that color-adjusted video will be subjected to additional color adjustment.

To solve this problem, Patent Citation 1, for example, discloses adding a header block to a plurality of images to indicate how the color and tone of the images are adjusted. This method requires two tags among the varied information for describing content, one for indicating which of the various standard color spaces is used, and one for specifying the color adjustment and the color editing that have been executed within that color space. By adding a flag that specifies the color space xvYCC and indicates that color adjustment has taken place, and another flag that indicates the manner of that adjustment, to digital video as well, it is possible for the device that recognizes this to avoid performing color adjustment a second time and to perform processing to reverse the color adjustment that has already been performed, and thus the problem discussed above can be avoided.

Patent Citation 1: Japanese Laid-Open Patent Publication No. 2003-153025 (pgs. 4 through 6, FIG. 1)

DISCLOSURE OF INVENTION

Technical Problem

However, although the xvYCC color space can be utilized as a wide color gamut color space for color adjustment, in practice it is difficult to maintain compatibility with conventional devices due to the media on which the information is recorded. Moreover, it is also difficult to guarantee the precision with which video color is reproduced.

When handling video, which is a moving picture, and the encoded color space is different for each individual video or for each frame of an individual video, to properly record and reproduce those videos, a new dedicated video file format becomes necessary, and substantial time is required for color space conversion processing during video editing and continuous playback of video. Moreover, executing identical color adjustment for an xvYCC color space on a conventional YCbCr-only recording medium has the adverse effect of significant color and tone loss.

It is therefore desirable for xvYCC-only media to be clearly distinguished from conventional YCbCr-compatible media.

The issue to be solved by the invention is to achieve a video signal processing device, a video signal processing method, a video signal processing program, a recording medium, and an integrated circuit, which utilize the space interchangeability between video signals in a wide color gamut xvYCC color space and video signals in the conventional YCbCr color space, while making it possible to add a novel color representation such as vivid coloring or tone that conventionally has not been used for digital video signals, without causing confusion of the color space.

Technical Solution

A first aspect of the invention is a video signal processing device that includes a video color gamut obtaining portion that obtains a color gamut of a video signal, a color adjustment portion that performs color adjustment on the video signal, based on the color gamut of the video signal that is obtained by the video color gamut obtaining portion, and a color adjustment information output portion that outputs information on the color adjustment that was performed by the color adjustment portion.

Thus, the color gamut of the video signal can be known, and the color gamut of the video signal can be expanded. Moreover, since it is possible to output information on the color adjustment that is performed by the color adjustment portion, it is for example possible for the video signal that has been processed by the video signal processing device to be output to the video signal display device, for example, or written to a recording medium, along with information on the color adjustment, which is the processing that is performed.

It should be noted that here, "information on the color adjustment" is for example information that indicates whether or not color adjustment has been performed on the video signal, information on the target color space for the color adjustment on the video signal, or information that indicates whether or not color gamut compression has been performed on the color-adjusted video signal.

A second embodiment of the invention is the first embodiment of the invention, further including a recording medium type detection portion that detects the medium type of a recording medium for recording the video signal.

Thus, it is possible to ascertain the color gamut of the video signal, and to extend the color gamut of the video in accordance with the recording medium type.

A third aspect of the invention is the first or the second aspect of the invention, in which the color adjustment portion performs color adjustment on the video signal by expanding a first color space that is determined from the color gamut of the video signal to either one of a second color space that has a wider color gamut than the first color space or a third color space that is wider than the second color space, based on the color gamut and the medium type.

Thus, the color gamut of the video signal can be extended according to the recording medium type, and this allows a video signal with an extended color gamut to be faithfully recorded to the recording medium. Further, because a mixture of video signals that have been extended to different color gamuts are not recorded to a single recording medium, it is not necessary for complex processing to be performed at the time of playback. It should be noted that here, the "first color space" refers to a color space that can secure all gamuts that are contained in the video signal, and for example, in FIG. 2, when 204 is the color gamut of the video signal, it corresponds to the BT709-RGB color space of reference numeral 201. The "second color space" corresponds to the BT709-YCbCr color space 210 in FIG. 2, for example. The "third color space" corresponds to the xvYCC color space 202 in FIG. 2, for example.

A fourth aspect of the invention is any one of the first through third aspects of the invention, in which the color adjustment portion has a color space selection portion, a color expansion portion, and a color compression portion. The color space selection portion selects a target color space for adjusting the color of the video signal, based on the medium type of the recording medium. The color expansion portion expands the color gamut of the video signal within the color space that has been selected by the color space selection portion, with an expansion ratio that is determined based on the medium type and the color gamut of the video signal that is obtained by the video color gamut obtaining portion. The color compression portion compresses the color gamut of the video signal that has been expanded by the color expansion portion, with a compression ratio that is determined based on the medium type of the recording medium and the color gamut of the video signal that has been processed by the color expansion portion.

Thus, for example it is possible to perform a fixed color creation operation on a video signal that has been captured, while recording and optimally performing color compression for the color space for recording the video signal, and it is possible to add new color representation such as vivid coloring or tone that has not conventionally been used in digital video. Further, compressing the color gamut and then recording to a recording medium also allows conventional reproduction devices to achieve color reproduction with guaranteed color reproduction precision. It should be noted that here, "expansion" refers to a concept that includes the case of not performing expansion. For example, if the color gamut of the video signal is sufficiently wide, then it is not necessary to carry out expansion, and thus the expansion portion does not perform processing to expand the color gamut. Further, "compression" refers to a concept that includes the case of not performing compression. For example, if the recording medium stores only video signals that lack color compression, then it is not necessary to perform compression, and thus the color compression portion does not perform compression processing.

It should be noted that with regard to the processing of the fourth aspect of the invention, it is possible for the entire video to be processed in real time one frame at a time, or, before actually recording to the recording medium, it is possible to temporarily record the video to an internal hard disc, for example, and then write to the recording medium after optimizing the color adjustment for the entire video.

A fifth aspect of the invention is any one of the first through fourth aspects of the invention, in which the color adjustment portion includes a storage portion that stores a predetermined amount of the video signal, an analysis portion that analyzes temporal changes in the color gamut of the predetermined amount of video signal that is stored in the storage portion, and a predetermined amount color adjustment portion that performs color adjustment on the predetermined amount of video signal that is stored, based on the result of the analysis by the analysis portion.

Thus, for example, after temporarily storing a single sequence of the video signal in the storage portion, the temporal changes in the video color gamut of the video signal of that single sequence is analyzed by the analysis portion, and a color adjustment parameter for widening the color gamut can be set based on the results of that analysis, and thus color adjustment that considers temporal fluctuations can be performed. Further, the color adjustment parameter can be used to perform color adjustment on the entire captured video that is optimal for the entire video sequence that has been color adjusted and recorded within the color space, and it is possible to add new color representation such as vivid coloring or tone that was not conventionally used in digital video.

A sixth aspect of the invention is the fifth aspect of the invention, in which the predetermined amount of video signal that is stored in the storage portion is a single sequence of video signal.

A seventh aspect of the invention is the fifth aspect of the invention, in which the predetermined amount of video signal that is stored in the storage portion is one or more GOPs of the video signal.

An eighth aspect of the invention is the fifth aspect of the invention, in which the predetermined amount of video signal that is stored in the storage portion is one or more frames of the video signal.

A ninth aspect of the invention is any one of the first through eighth aspects of the invention, further including a video information writing portion. The video information writing portion records information relating to the color adjustment that is performed by the color adjustment portion to the recording medium. It should be noted that here, "information relating to the color adjustment" is a concept that is inclusive of information on the color space that has been selected.

Thus, situations in which video signals that deal with different color spaces are recorded onto the same recording medium are obviated, and therefore without confusing the color space it is possible to add new color representation such as vivid coloring or tone that has not conventionally been used in digital video.

A tenth aspect of the invention is any one of the first through ninth aspects of the invention, in which the video information writing portion records the fact that color adjustment has been performed on the video signal by the color adjustment portion, to the recording medium as information.

Thus, for example, the reproduction device learns whether or not color adjustment was performed at the time of recording, and this makes it possible to prevent the reproduction device from performing unnecessary processing such as performing color adjustment twice, eliminates confusion of the color adjustment processing, and allows for the addition of new color representation such as vivid coloring or tone that has not conventionally been used in digital video, and it becomes possible to faithfully reproduce video.

An eleventh aspect of the invention is any one of the first through tenth aspects of the invention, in which the video information writing portion records information on the target color space of color adjustment on the video signal by the color adjustment portion to the recording medium.

Due to this, the color space in which color adjustment is performed can be known, and thus it is possible to perform suitable color signal processing with a device other than that which recorded the video signal.

A twelfth aspect of the invention is any one of the first through eleventh aspects of the invention, in which the video information writing portion records a degree of compression, in a case where the color gamut of the video signal has been compressed by the color adjustment portion, as information to the recording medium.

Thus, it is possible to record video whose color has been created for an xvYCC color space on video recording media that do not support the xvYCC color space, for example, and can be reproduced when playback is performed, and it is possible to add new color representation such as vivid coloring or tone that has not conventionally been used in digital video.

A 13th aspect of the invention is any one of the first through twelfth aspects of the invention, in which the color space is a YCbCr color space or an xvYCC color space. Here, "YCbCr color space" is the conventional YCbCr color space, and refers to the BT709-YCbCr color space.

Thus, by using the conventional YCbCr color space or the xvYCC color space as the color space, it is possible to retain compatibility with conventional art while adding new color representation such as vivid coloring or tone that has not conventionally been used in digital video.

A 14th aspect of the invention is a recording medium that stores at least a video signal, and any one or more of information that indicates whether or not color adjustment has been performed on the video signal, information on a target color space for color adjustment on the video signal, and information that indicates whether or not color gamut compression has been performed on the color-adjusted video signal.

By using this recording medium, a wide band color signal can be processed while maintaining compatibility with the conventional art without causing confusion of the color space in the recording system and the reproduction system. Consequently, it is possible to eliminate confusion, which is not useful to video reproduction, and to add new color representation such as vivid coloring or tone that has not conventionally been used in digital video. As regards the format for realizing this recording medium, it can be located at a hierarchally high order of an existing video compression method, and thus it is not particularly necessary to makes changes to the existing video compression method. In other words, without changing the format of the existing video compression method, the recording medium can be achieved by for example freely using a specific field whose use is allowed, and thus upward compatibility is achieved and compatibility with conventional devices can be secured.

A 15th aspect of the invention is a recording medium that stores at least a video signal, and information that indicates whether or not color adjustment has been performed on the video signal.

By using this recording medium, a wide band color signal can be processed while maintaining compatibility with the conventional art, without causing confusion of the color space in the recording system and the reproduction system. Further, this recording medium makes it possible to know whether or not color adjustment has been performed on a video signal, from the information that indicates whether or not color adjustment has been performed, and thus for example it is possible to prevent extra color adjustment from being performed in the reproduction system on a video signal that has already been subjected to color adjustment in the recording system, and the resulting deterioration in quality of the video signal.

A 16th aspect of the invention is the 15th aspect of the invention, in which the color adjustment presence information indicates whether or not color adjustment was performed on the video signal by expanding a first color space that is determined from the color gamut of the video signal to either one of a second color space that has a wider color gamut than the first color space or a third color space that is wider than the second color space.

A 17th aspect of the invention is a recording medium that stores at least a video signal, and color adjustment target color space information that indicates a target color space for color adjustment on the video signal.

By using this recording medium, a wide band color signal can be processed while maintaining compatibility with the conventional art, without causing confusion of the color space in the recording system and the reproduction system. Further, this recording medium allows information on the target color space for color adjustment to be obtained based on the color adjustment target color space information, and thus in the reproduction system, appropriate signal processing based on the color adjustment target color space information can be performed.

An 18th aspect of the invention is the 17th aspect of the invention, in which the color adjustment target color space information indicates an expanded target color space in a case where color adjustment has been performed on the video signal by expanding a first color space that is determined from the color gamut of the video signal to either one of a second color space that has a wider color gamut than the first color space or a third color space that is wider than the second color space.

A 19th aspect of the invention is a recording medium that stores at least a video signal, and color gamut compression information that indicates whether or not color gamut compression has been performed on the color-adjusted video signal.

By using this recording medium, a wide band color signal can be processed while maintaining compatibility with the conventional art without causing confusion of the color space in the recording system and the reproduction system. Further, this recording medium allows whether or not color gamut compression has been performed on the color-adjusted video signal to be known based on the color gamut compression information, and thus in the appropriate signal processing based on the color gamut compression information can be performed reproduction system.

A 20th aspect of the invention is the 19th aspect of the invention, in which the color gamut compression information indicates whether or not color gamut adjustment has been performed on the video signal, after performing color adjustment on the video signal by expanding a first color space that is determined from the color gamut of the video signal to either one of a second color space that has a wider color gamut than the first color space or a third color space that is wider than the second color space.

A 21st aspect of the invention is the recording medium according to any one of the 14th through 20th aspects of the invention, used in the video signal processing device according to any one of the first through 13th aspects of the invention.

A 22nd aspect of the invention is a video signal processing method that includes a video color gamut obtaining step of obtaining a color gamut of a video signal, a color adjustment step of performing color adjustment on the video signal, based on the color gamut of the video signal that is obtained in the video color gamut obtaining step, and a color adjustment information output step of outputting information on the color adjustment that was performed in the color adjustment step.

Thus, it is possible to realize a video signal processing method that achieves the same effects as the first aspect of the invention.

A 23rd aspect of the invention is a video signal processing program for causing a computer to function as a video color gamut obtaining portion that obtains a color gamut of a video signal, a color adjustment portion that performs color adjustment on the video signal, based on the color gamut of the video signal that is obtained by the video color gamut obtaining portion, and a color adjustment information output portion that outputs information on the color adjustment that was performed by the color adjustment portion.

Thus, it is possible to realize a video signal processing program that achieves the same effects as the first aspect of the invention.

A 24th aspect of the invention is an integrated circuit that includes a video color gamut obtaining portion that obtains a color gamut of a video signal, a color adjustment portion that performs color adjustment on the video signal, based on the color gamut of the video signal that is obtained by the video color gamut obtaining portion, and a color adjustment information output portion that outputs information on the color adjustment that was performed by the color adjustment portion.

Thus, it is possible to realize an integrated circuit that achieves the same effects as the first aspect of the invention.

A 25th aspect of the invention is the 21st aspect of the invention, further provided with a recording medium type detection portion that detects a medium type of a recording medium to which the video signal is recorded. The color adjustment portion performs color adjustment so as to expand the color gamut of the video signal to either one of a first color space that has a wider color gamut than a color gamut that includes the color gamut of the video signal, or a second color space that is wider than the first color space, based on the color gamut of the video signal that is obtained by the video color gamut obtaining portion and the medium type of the recording medium that is detected by the recording medium type detection portion.

Thus, it is possible to realize an integrated circuit that achieves the same effects as the second aspect of the invention.

Advantageous Effects

With the video signal processing device according to the invention, a novel video processing device, video signal processing method, video signal processing program, recording medium, and integrated circuit that can utilize the compatibility between the spaces of video that has been encoded in the wide-color-gamut xvYCC system and video that has been encoded in the conventional YCbCr system are proposed, and these allow for the addition of new color representation such as vivid coloring or tone that has not conventionally been used in digital video without causing confusion of the color space.

BRIEF DESCRIPTION OF DRAWINGS

FIG. 7 is an explanatory diagram of the video information of the recording format of the video signal processing device according to the first embodiment of the invention.

Figure 1:
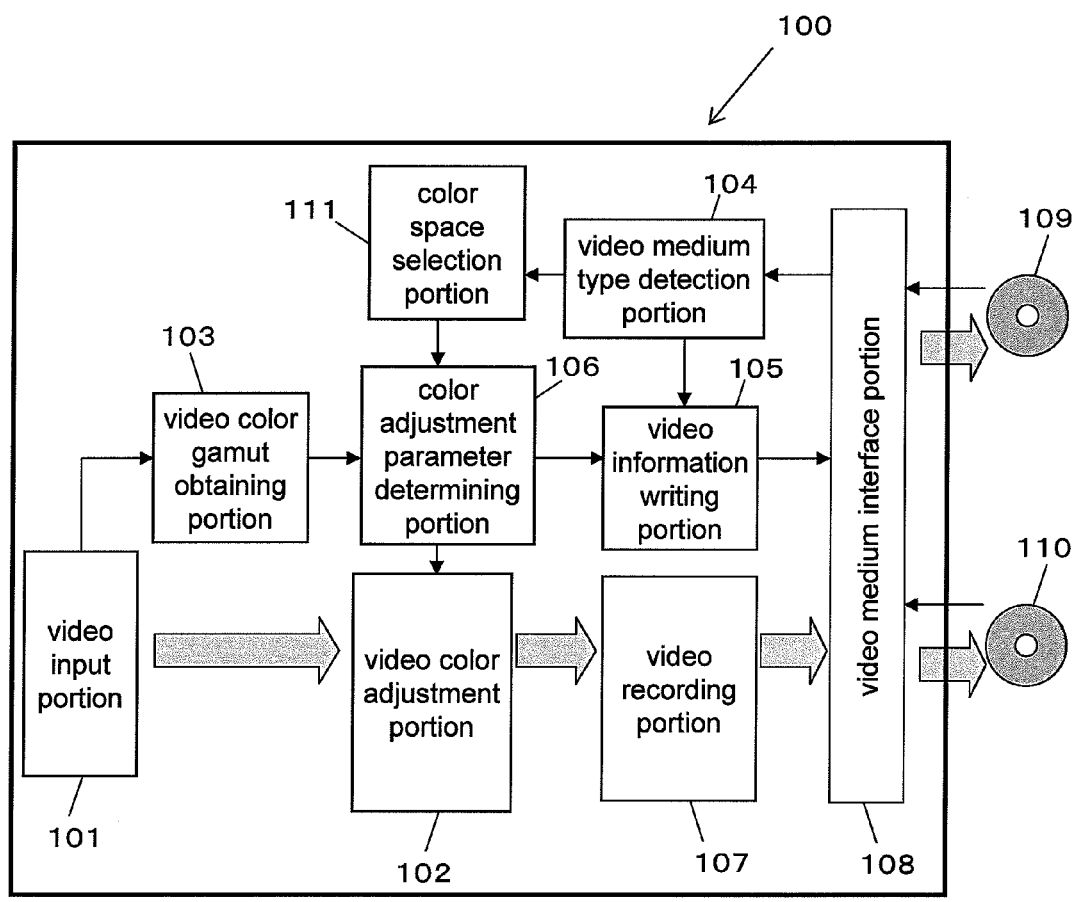
FIG. 1 is an overall view of the configuration of the video signal processing device according to the first embodiment of the invention.

EXPLANATION OF REFERENCE 100, 100' video signal processing device
101 video input portion
102 video color adjustment portion
103 video color gamut obtaining portion
104 video medium type detection portion
105 video information writing portion
106 color adjustment parameter determining portion
107 video recording portion
108 video medium interface portion
109 conventional video recording medium (conventional YCbCr color space recording/storage medium)
110 xvYCC video recording medium
602 medium information
603 moving video file group
901 expansion/compression portion
902 color expansion portion
903 processed video color gamut obtaining portion
904 color adjustment parameter revision portion
905 color compression portion
1201 stored video color adjustment portion
1202 temporary storage portion
1203 stored video analysis portion
1204 color adjustment parameter revision portion

BEST MODE FOR CARRYING OUT THE INVENTION

First Embodiment

<Overall Configuration and Operation>

FIG. 1 shows the overall configuration of a video signal processing device 100 according to the first embodiment of the invention. A camera device for videos and movies, for example, is envisioned as the video signal processing device 100.

The video signal processing device 100 according to the invention primarily includes a video input portion 101, a video color adjustment portion 102, a video recording portion 107, a video medium interface portion 108, a video color gamut obtaining portion 103, a video medium type detection portion 104, a video information writing portion 105 that serves as a color adjustment information output portion, a color space selection portion 111, and a color adjustment parameter determining portion 106.

The video input portion 101 captures the video image and creates a digital video color signal YCbCr. In FIG. 1, the flow of data from 101 to 102, 107, 108, and then 109 (or 110) is the flow of processing of the video, and the other signal lines indicate the flow of information. For the most part these processes are carried out for each frame of the moving picture, with the exception of the interframe processing that is executed during encoding, such as moving picture compression.

The video color adjustment portion 102 executes color adjustment on the digital video in order to produce images that are represented in prettier colors. In other words, color correction for expanding the color gamut of the video signal from a conventional color gamut to an extended color gamut is executed.

The video color gamut obtaining portion 103 obtains the color gamut information of the video signal from the video input portion 101 in order to determine the color adjustment parameter for expanding from a conventional color gamut to an extended color gamut.

The video medium type detection portion 104 determines whether or not the video medium (video recording medium) 109 or 110 that has been set as the recording medium supports an expanded color space such as xvYCC. This determination is made by obtained information from the recording medium 110 that for example indicates that the recording medium 110 is compatible with xvYCC. For example, a conceivable example of a conventional recording medium 109 is a medium the predates the proposal of the xvYCC standard, and such a medium will not contain information that indicates compatibility with xvYCC, and thus it can be determined that the medium is a conventional recording medium 109 based on fact that this information does not exist. It should be noted that here, "compatibility with xvYCC" is not determined based on whether or not a video signal in the xvYCC standard can be physically stored on the recording medium, but rather whether or not it is okay to record a signal in the xvYCC standard to that recording medium. While it is possible to physically record a video signal in the xvYCC standard to conventional recording media 109 as well, video signals in the xvYCC standard are not recorded to those recording media 109 to which video signals in the conventional YCbCr color space, not video signals in the xvYCC standard, have been recorded already. In other words, a "recording medium that is compatible with xvYCC" refers to a recording medium on which only video signals in the xvYCC color space are recorded to the recording medium, and a "recording medium that is compatible with conventional YCbCr" refers to a recording medium on which only video signals in the conventional YCbCr color space (BT709-YCbCr color space) are recorded to the recording medium.

The color space selection portion 111 selects a color space for encoding the video based on the media type that has been detected by the video medium type detection portion 104. For example, if the medium information that is detected by the video medium type detection portion 104 indicates that the recording medium 109 stores only video signals in the BT709-YCbCr color space, then it selects BT709-YCbCr color space as the color space for video encoding. If the medium information that is detected by the video medium type detection portion 104 indicates that the recording medium 110 stores video signals that are included in the xvYCC color space, then it selects xvYCC color space as the color space for video encoding.

The video information writing portion 105 receives the above results and performs processing for writing to the recording media 109 and 110, through the video medium interface portion 108, information that indicates the color space that was selected and the color expansion that was performed on the video.

The color adjustment parameter determining portion 106 determines the color adjustment parameter for selecting which color space to use for color gamut extension, based on the information from the video color gamut obtaining portion 103 and the information from the video medium type detection portion 104, and sends this to the video color adjustment portion 102.

The video recording portion 107 executes encoding for writing the color-adjusted video to the video medium (video recording medium) in fixed units, for example.

The video medium interface portion 108 is a read/write interface for obtaining information from the recording media 109 and 110 and writing video to the recording media 109 and 110.

The conventional video recording medium 109 is a medium that records and stores only video encoded in the YCbCr color space defined by BT709 (this shall be referred to as "BT709-YCbCr").

The xvYCC video recording medium 110 is a medium that records and stores video that has been encoded in the xvYCC color space. The thawing diagrams a configuration in which these two video media (video recording media) types are connected, but ordinarily only one type is connected.

<Color Adjustment Method>
The method of color adjustment in the video signal processing device 100 according to the invention is described.

A primary example of the color adjustment that is executed by the video color adjustment portion 102 is color extension processing for the sake of image production for effectively using the wider color gamut of the wide-color-gamut display devices of recent years. For example, colors that have the characteristic of a strong visual appeal to humans, such as reds and greens, are effectively adjusted through increasing their saturation by relatively expanding the chroma signals Cr and Cb of the video.

Figure 2:
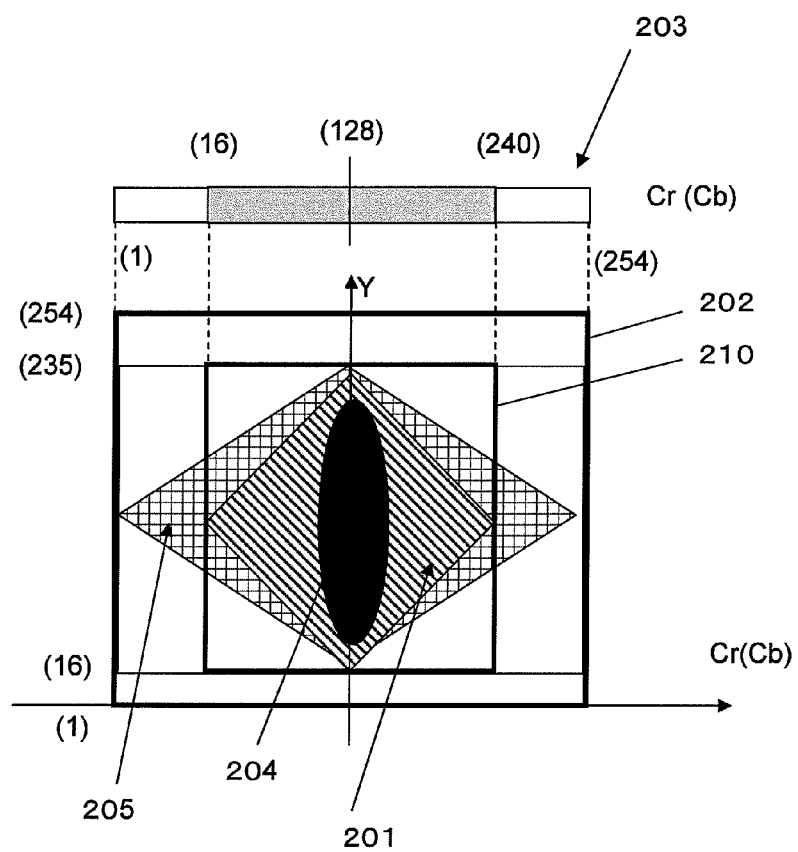
FIG. 2 explains the BT709 color space and the xvYCC color space.

The color adjustment parameter that is implemented by the color adjustment parameter determining portion 106 is described using FIG. 2. In order to avoid confusion between reference numerals, in FIG. 2 the 8-bit digital value is expressed as "(N)" (where N is an integer).

A BT709-RGB color space 201, which is shown by the diagonal line area in the drawing, is the range that can be displayed by conventional display devices such as TVs. In contrast, an xvYCC color space 202 that is defined by the luminance Y axis and the chroma axis Cr (or Cb) is represented by the region 202 that is enclosed by the bold line in FIG. 2. The xvYCC color space is a region in which Y (luminance) is expressed by a value from 1 to 254 and both Cr and Cb (chroma) are expressed by a value from 1 to 254, but here only the chroma direction in particular is an issue, and thus a signal range 203 is depicted as the range of color. Accordingly, the Cr and the Cb signal both can take on a value from 1 to 254 in xvYCC, but the Cr or Cb value in the corresponding BT709-RGB color space is from 16 to 240 in both cases, and the achromatic position is just at 128.

A color gamut 204 of the video signal represents the range of the video signal, and ordinarily produces in a color distribution that extends in the luminance direction as shown in the drawing. Here, the color adjustment parameter represents the extent of color adjustment and is determined based on the color gamut of the video and the color gamut 205 of the extended color gamut TV for reproducing the video, but since the device information on the TV that will be connected is completely unknown at the time that video is captured with the video signal processing device 100, the color adjustment parameter is for example determined by selecting whether the conventional BT709-YCbCr color space or the xvYCC color space is presumed for the encoding color space. It should be noted that the region that is shown by 210 in FIG. 2 is the BT709-YCbCr color space, and the region that is shown by 202 is the xvYCC color space.

The method for choosing the color adjustment parameter is as follows.

First, the video medium type detection portion 104 determines whether the recording medium is compatible with the BT709-YCbCr color space or is compatible with the xvYCC color space from the information of the recording medium.

Figure 3:
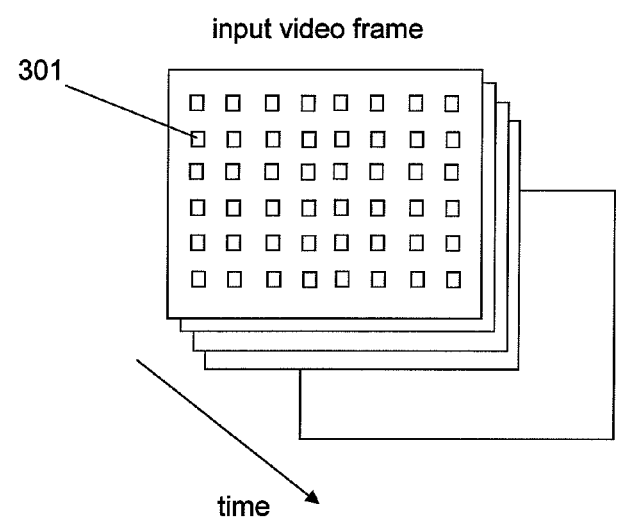
FIG. 3 is an explanatory diagram of the operation of the video color gamut obtaining portion of the video signal processing device according to the first embodiment of the invention.

As shown in FIG. 3, the video color gamut obtaining portion 103 spatially samples the distribution within the frame of the YCbCr signal, and approximately obtains the color gamut information of the video. Video differs from still images in that there is a greater amount of data amount, and there is too much data to determine this for all pixels of all frames of the video. Additionally, if numerous pixels contain noise, for example, there is also the risk of incorrect determination. Accordingly, for each frame of the video, a plurality of pixels 301 in the same frame are sampled and the color gamut in the conventional YCbCr color space is statistically determined.

Figure 4:
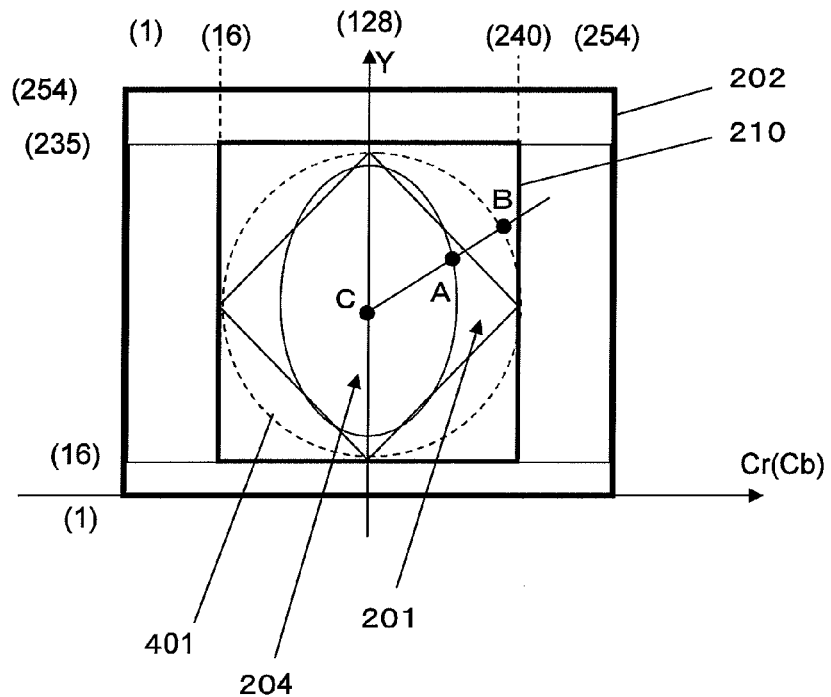
FIG. 4 is an explanatory diagram of the color adjustment parameter calculation method of the video signal processing device according to the first embodiment of the invention, in a case where the color space of the recording method is the conventional YCbCr color space.

If the recording medium conforms to the conventional YCbCr color space, then a virtual color gamut 401 that depicted by the dashed lined in FIG. 4 is set as the target color distribution for the color adjustment. The virtual color gamut 401 is set within the BT709-YCbCr color space and Cr and Cb (chroma) both are proximate to the range of 16 to 240, and is characterized in that it is slightly larger than the BT709-RGB color space and its shape resembles the color distribution of the original video. The color of point A shall be the color of the original video, and C shall be a point on the luminance Y axis near the center of the color gamut of the video. The color adjustment parameter Ratio is represented as follows, using a straight line that connects point A and point C, and the intersection B with the virtual color gamut 401.

$$\text{Ratio} = \frac{\overline{BC}}{\overline{AC}} \quad \text{[Eq. 1]}$$

Using this color adjustment parameter, the color adjustment is represented as follows in a gamma-corrected, non-linear RGB space. In the following equation, all apostrophes (') represent non-linearity (value after gamma correction), and the format of BT709 is used as the method for converting from conventional YCbCr to RGB. The RGB values of points A, B, and C are represented by $R_A$, $G_A$, $B_A$, etc.

$$\begin{pmatrix} R'_B \\ G'_B \\ B'_B \end{pmatrix} = \begin{pmatrix} R'_C \\ G'_C \\ B'_C \end{pmatrix} + \text{Ratio} \cdot \begin{pmatrix} R'_A - R'_C \\ G'_A - G'_C \\ B'_A - B'_C \end{pmatrix} \quad \text{[Eq. 2]}$$

$$\begin{pmatrix} R' \\ G' \\ B' \end{pmatrix} = \begin{pmatrix} 1 & 0 & 1.5748 \\ 1 & -0.1873 & -0.4681 \\ 1 & 1.8556 & 0 \end{pmatrix} \begin{pmatrix} Y'_{709} \\ Cb'_{709} \\ Cr'_{709} \end{pmatrix} \quad \text{[Eq. 3]}$$

Figure 5:
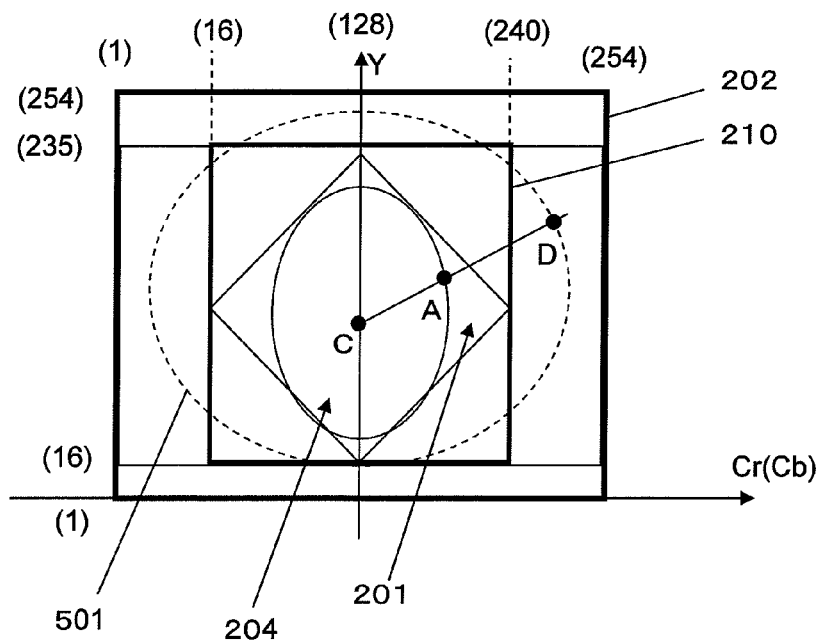
FIG. 5 is an explanatory diagram of the color adjustment parameter calculation method of the video signal processing device according to the first embodiment of the invention, in a case where the color space of the recording method is the xvYCC color space.

If the recording medium conforms to the xvYCC color space, then a virtual gamut 501 that is depicted by the dotted line in FIG. 5 is set as the target color distribution for color adjustment. This virtual color gamut is set within the xvYCC color space and both Cr and Cb (chroma) exceed the range of 16 to 240, and is characterized in that its shape resembles the color distribution of the original video. The color of the point A shall be the color of the original video, and C shall be a point on the luminance Y axis near the center of the color gamut of the video. The color adjustment parameter Ratio is represented as follows, using a straight line that connects point A and point C, and the intersection D with the virtual color gamut 501.

$$\text{Ratio} = \frac{\overline{DC}}{\overline{AC}} \quad \text{[Eq. 4]}$$

The actual color adjustment is performed on the color adjustment parameter like in Equation 2. In this case, the Ratio value is larger than before, and as a result, the color adjustment is executed using a color gamut that is accordingly wider.

Although various methods other than this method are known for the method of color adjustment for the purpose of "preferable image creation" accompanying color expansion, the basic principle of changing the color adjustment parameter according to the color space of the recording medium is as described above.

It should be noted that this embodiment is described under the assumption that extremely large color adjustment is performed as the color adjustment that is executed for the purpose of "preferable image creation," but in cases where a very vivid object is captured, for example, the color gamut of the captured object is itself very wide. Further, an even wider color gamut may become necessary if color adjustment to the degree of color balance correction is performed on the captured object with the intention of faithfully reproducing the color. Thus, in cases where the color gamut of the original object to be captured is wide, then xvYCC compatibility becomes an issue in video recording other than with the intention of image production, and thus cases in which color adjustment is not intended for "preferable image creation", or in which color adjustment is not performed, also shall be included in the concept of "color adjustment" in the present invention. The same applies in the following embodiment as well.

<Operation of the Video Medium Type Detection Portion and the Video Information Writing Portion>

Next, the operations of the video medium type detection portion 104 and the video information writing portion 105 are described.

In this invention, two types of video media (video recording media) 109 and 110 are presumed, and this is significant with regard to the xvYCC-compatible video format. In the present invention, a single video recording medium type does not include video that has been encoded in different color spaces. The video recording media 109 and 110 refer to media such as DVDs, HDDs (hard discs), memory cards, and HDD within PCs that are connected over a network, to which color-adjusted video is recorded, and adopt a recording format in which more than one continuous video is recorded to a single medium.

Figure 6:
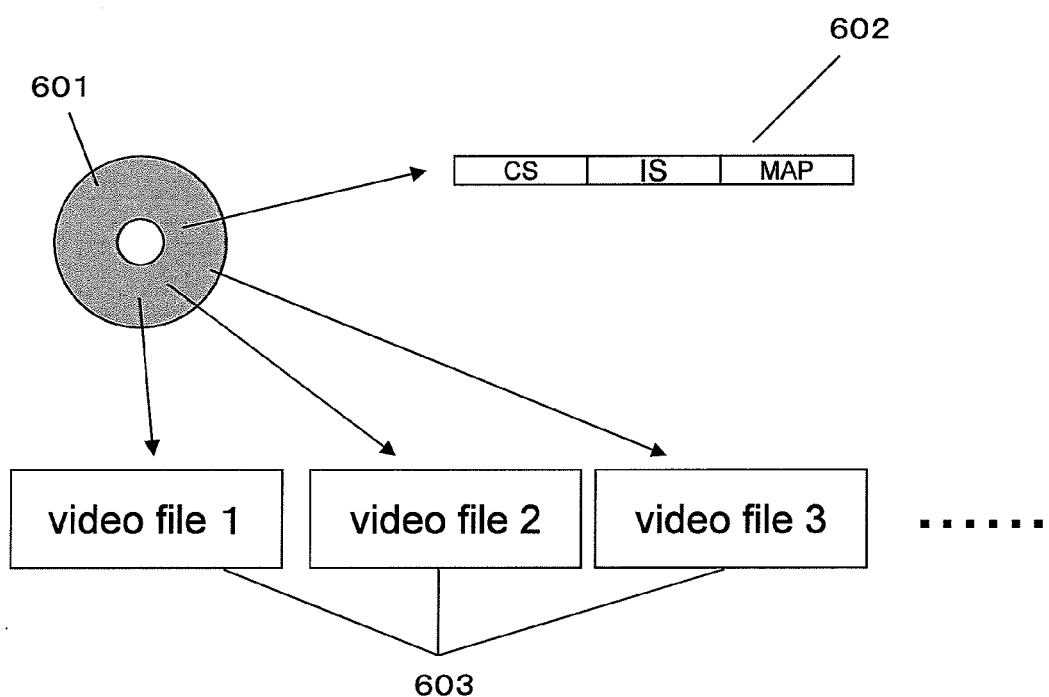
FIG. 6 is an explanatory diagram of the recording format of the recording medium according to the video signal processing device of the first embodiment of the invention.

FIG. 6 shows this recording format, in which a single unit of medium information 602 and a plurality of compressed moving video file groups 603 are recorded onto a single video recording medium 601. With regard to the information 602, CS (Color Space) indicates the color space that is used for video encoding, IST (Image State) indicates the state of adjustment of the image, and CMP (Compression) indicates the fact that color gamut mapping (color gamut compression) has been executed and the type of this mapping. FIG. 7 shows examples of each type of information. For example, CS=0 indicates the conventional YCbCr color space, whereas CS=1 indicates the xvYCC color space. In other words, the video medium type detection portion 104 of FIG. 1 can read this information and by doing so can confirm the video recording medium type. IST=0 indicates no color adjustment, whereas IST=1 indicates that there is color adjustment. In other words, the video information writing portion 105 of FIG. 1 can set this flag to 1 following color adjustment. CMP=0 indicates no compression and corresponds to a case in which the xvYCC color space is recorded as is, whereas CMP=n indicates the degree (n factor (n<1)) to which the color gamut of the video has been compressed (this is explained in greater detail in the second embodiment).

Figure 8:
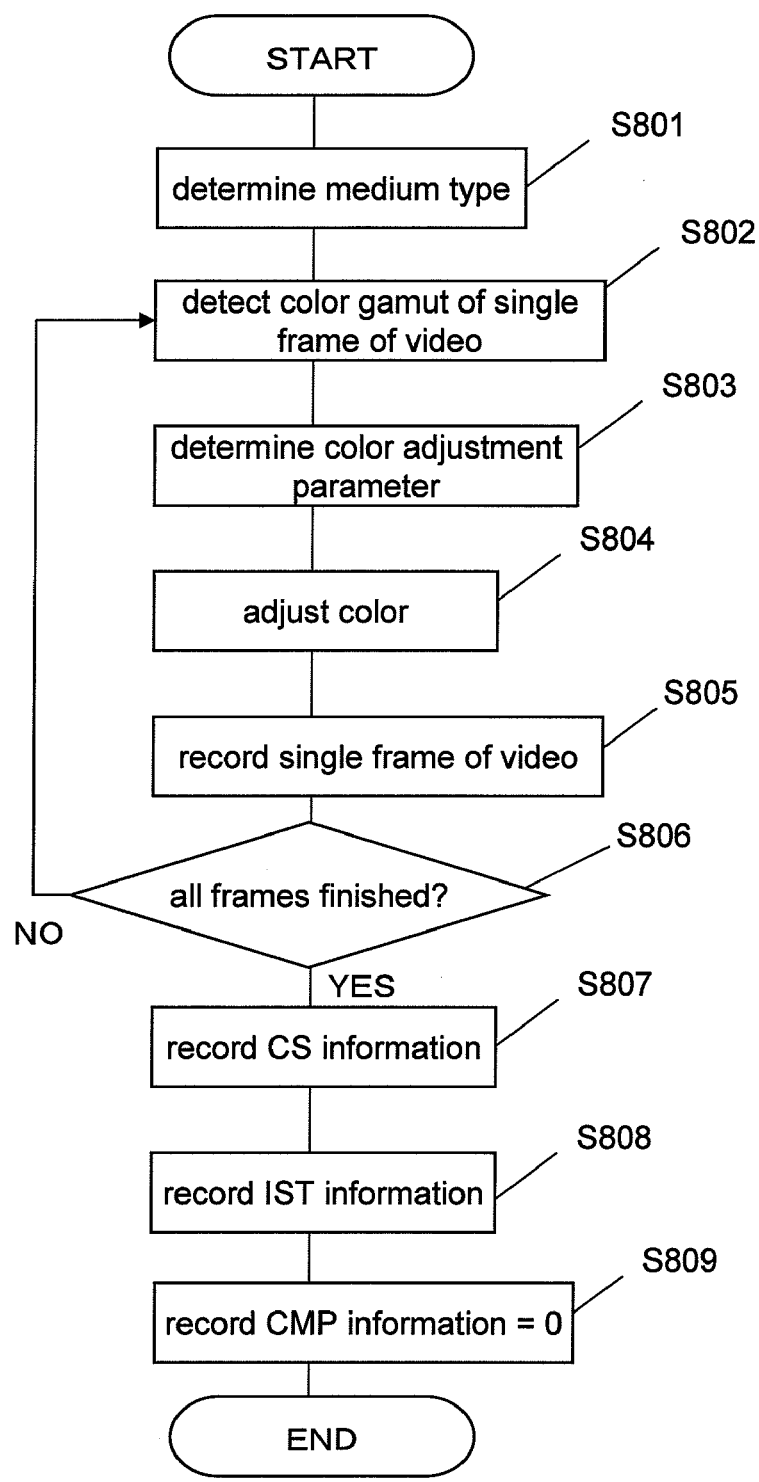
FIG. 8 is a flowchart of the processing of the video signal processing device according to the first embodiment.

FIG. 8 diagrams the flow of processing in this embodiment.

When recording is started with the video signal processing device 100 (such as a camera, etc.), first, in S801, the recording medium type is detected and the CS (Color Space) information is determined. In S802, the color gamut of one frame of video that is output from the video input portion 101 is analyzed. In S803, the color adjustment parameter for achieving the target color distribution is determined. In S804, actual color adjustment is executed on a single frame of video. In S805, the color-adjusted single frame of video is recorded, and in S806 it is determined whether or not this is the final frame, and if not the final frame, then the procedure is returned to S802. If recording is over, then in S807 the video information writing portion 105 records CS information of 0 or 1 (conventional YCbCr color space or xvYCC color space) to the recording medium, and in S808 the video information writing portion 105 records IST=1 (yes adjustment) to the recording medium. Then, in S809, the video information writing portion 105 records CMP=0 to the recording medium because the color gamut was not compressed in the course of recording. It should be noted that video compression is executed by the video recording portion 107 in section S805. It is also not absolutely necessary for recording of the video to occur each frame. It is of course also possible for a number of frames to be recorded together after performing processing for compression in the time direction.

Second Embodiment

Figure 9:
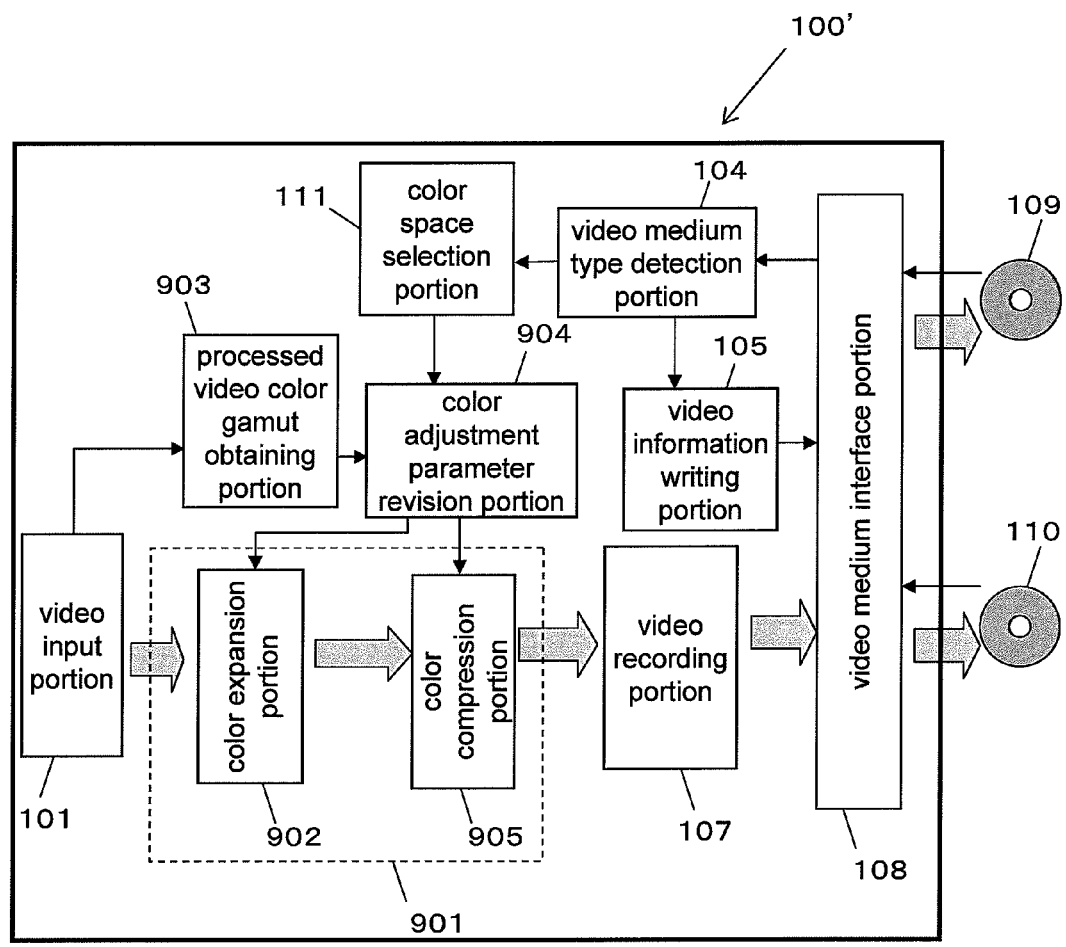
FIG. 9 is an overall view of the configuration of the video signal processing device according to the second embodiment of the invention.

FIG. 9 shows the overall configuration of a video signal processing device 100' according to a second embodiment of the invention. This differs from the configuration of FIG. 1 by the presence of an expansion/compression portion 901. The expansion/compression portion 901 is primarily made of a color expansion portion 902, a processed video color gamut obtaining portion 903, a color adjustment parameter revision portion 904, and a color compression portion 905.

The color expansion portion 902 performs color correction on the input video signal based on the color adjustment parameter that is determined by the color adjustment parameter revision portion 904, and if necessary also performs color expansion.

The color compression portion performs color compression according to the compression ratio that is determined based on the recording medium type and the color gamut of the input video signal. It should be noted that the color compression portion performs color compression only in a case where the recording medium type conforms to conventional YCbCr and the color gamut of the video signal that has been processed by the color expansion portion is wider than the conventional YCbCr color space. Color compression is carried out such that the color compression ratio by the color compression portion is the same value for the same recording medium.

The second embodiment differs from the first embodiment as follows.

In the first embodiment, video color was adjusted by performing color adjustment in real time while calculating the optimal color adjustment parameter for each frame from the target color space and information on the color gamut distribution of the video that has been input from the video input portion 101. In other words, processing was carried out after determining whether to perform color adjustment in an xvYCC color space or to perform color adjustment in the conventional YCbCr color space based on information on the color gamut distribution of the video signal.

The second embodiment differs from the first embodiment in that, regardless of the video signal type, an xvYCC color space is used as the target color space for performing color adjustment of the video signal. In other words, it differs from the first embodiment in that color gamut expansion is performed if the video signal has a narrow color gamut in order to expand the color gamut up to the xvYCC color space region.

Figure 10:
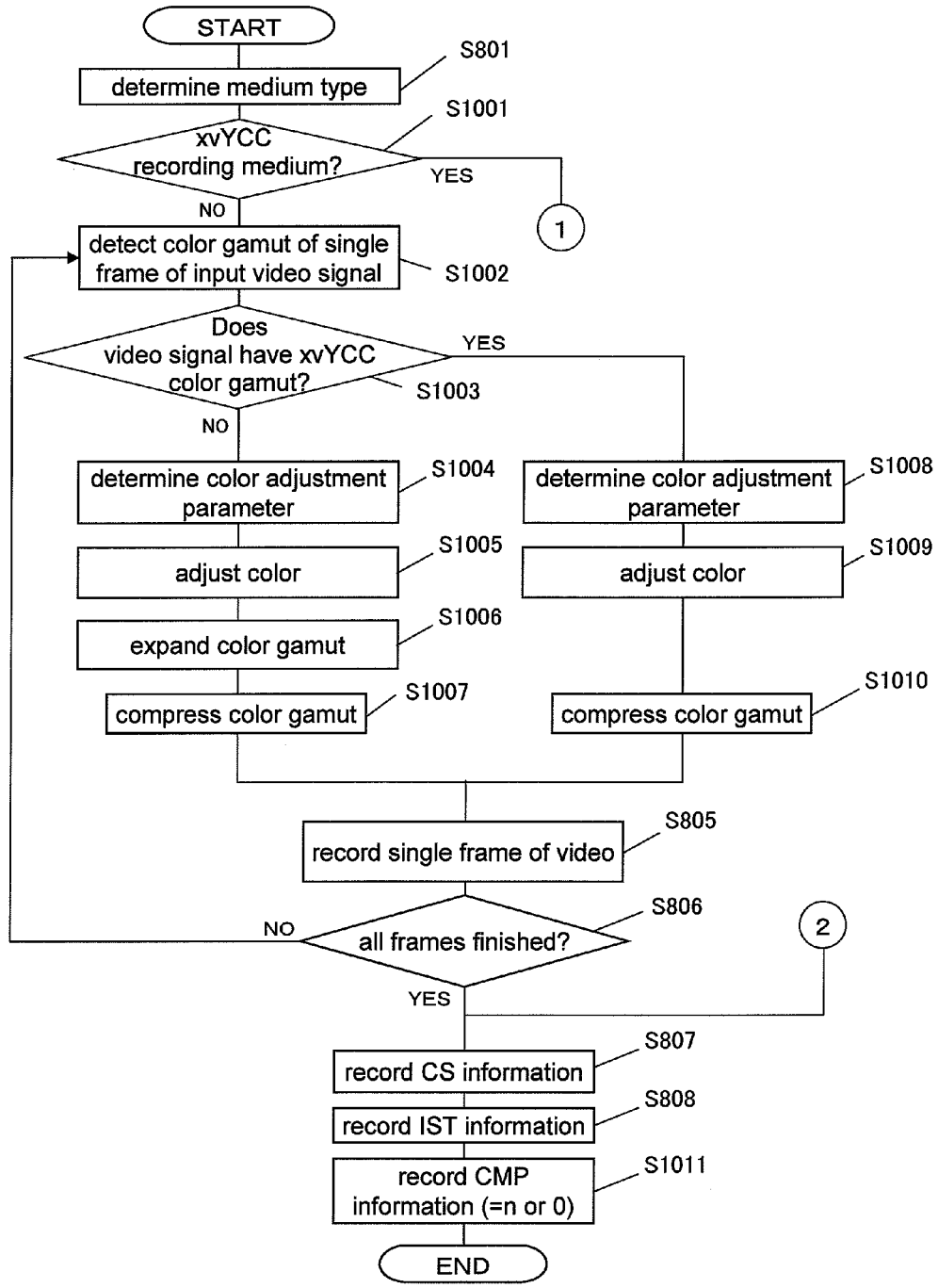
FIG. 10 is a flowchart of the processing of the video signal processing device according to the second embodiment of the invention.
Figure 11:
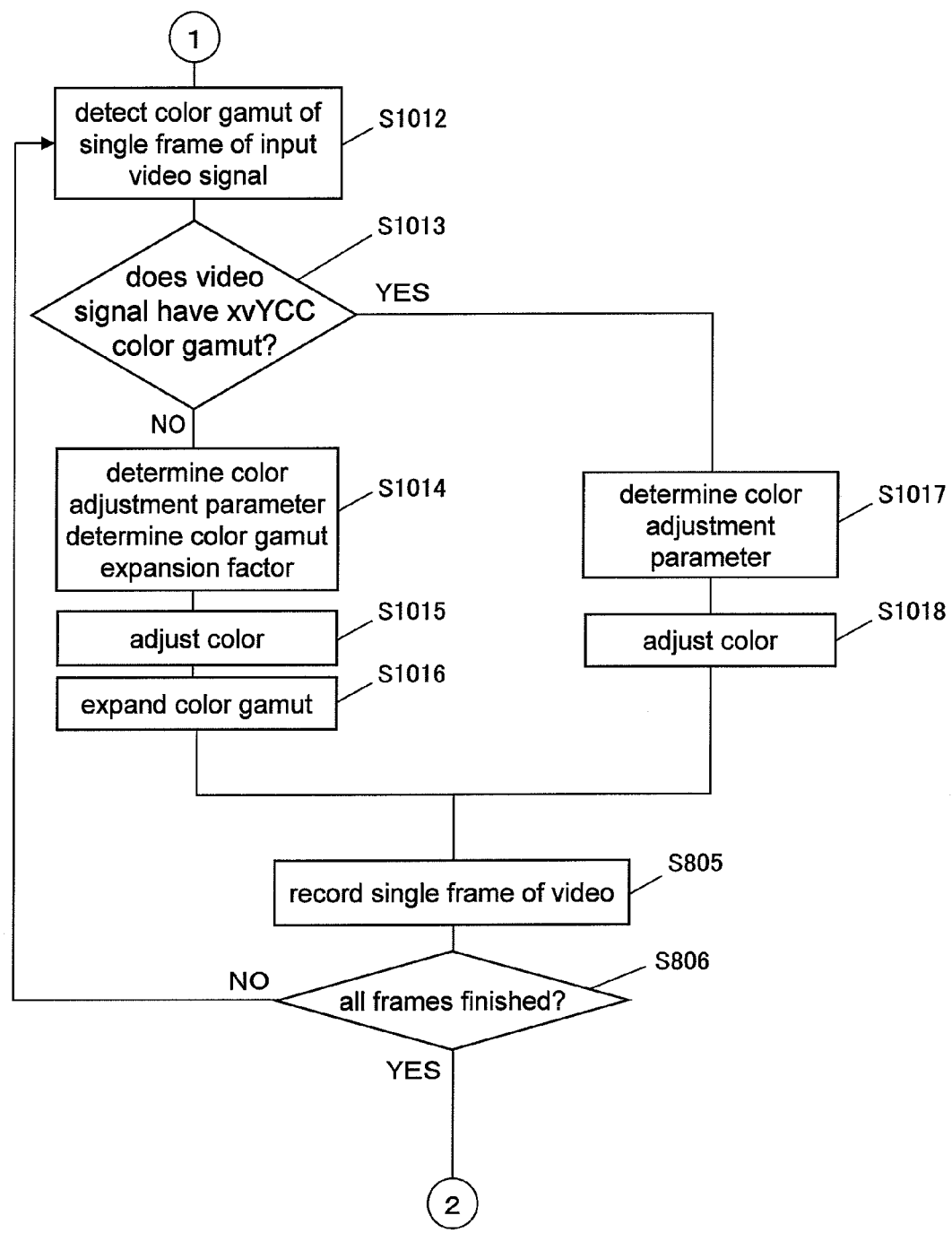
FIG. 11 is a flowchart of the processing of the video signal processing device according to the second embodiment of the invention.

FIGS. 9 to 11 are used to describe the operation of the video signal processing device 100' of the second embodiment of the invention.

The video medium type detection portion 104 determines the type of the recording medium (S801). If the recording medium is determined to be a conventional recording medium that conforms to YCbCr (S1001), then the processed video color gamut obtaining portion 903 detects the color gamut of one frame of the video signal of the input signal (S1002). If the color gamut of the video signal that is detected is in the xvYCC color space and the video signal has a sufficiently wide color gamut (S1003), then the color adjustment parameter revision portion 904 determines the color adjustment parameter and performs color adjustment based on that color adjustment parameter (S1008, S1009). The color adjustment parameter here can also be chosen by the user independent of the video color gamut or the color space, for example. For example, it may be preferable for separate calibration means or the like to fix the color of the captured object to a specific color. The process of fixing and thereby converting the colors in an RGB space of a captured object to a specific other color, for example, corresponds to the determination of the color adjustment parameter discussed here.

Next, the color compression portion 905 compresses the color gamut of the color-adjusted video signal, so that the color gamut of the color-adjusted video signal is stays within the conventional YCbCr color space (S1010). The video signal is then processed by the video recording portion 107 and recorded to the recording medium 109 by way of the video medium interface portion 108 (S805).

If the color gamut of one frame of the input signal that is determined in S1002 is not the xvYCC color space and the video signal has a narrow color gamut, then the color adjustment parameter revision portion 904 chooses a color adjustment parameter and performs color adjustment on the video signal based on that color adjustment parameter (S1004, S1005), after which the color expansion portion 902 expands the color gamut toward the xvYCC color space (S1006). The color compression portion 905 then compresses the color gamut of that color-adjusted video signal so that the color gamut of the video signal that has been subjected to color adjustment and color gamut expansion processing stays within the conventional YCbCr color space (S1007). For example, in FIG. 5, the color gamut 204 of the original video signal is first subjected to color gamut expansion by the color expansion portion 902 until becoming the virtual color gamut 501 in the xvYCC color space, and then the processed video color gamut obtaining portion 903 determines whether the color gamut extends beyond this and simultaneously detects the recording medium type and determines the color space. From this information, the color compression portion 905 uses a color adjustment parameter for weakening color adjustment by the color adjustment parameter revision portion 904 in order to compress the color gamut-expanded video signal to keep it within the conventional YCbCr color space.

Next, the video signal is processed by the video recording portion 107 and is recorded to the recording medium 109 via the video medium interface portion 108 (S805).

The processing from S1002 is continued until all frames are processed (S806).

If the recording medium type is determined in S801 to conform to the xvYCC color space, then the processed video color gamut obtaining portion 903 detects the color gamut of one frame of the video signal of the input signal (S1012). If the color gamut of the detected video signal is in the xvYCC color space and the video signal has a sufficiently wide color gamut (S1013), then the color adjustment parameter revision portion 904 determines the color adjustment parameter and performs color adjustment based on that color adjustment parameter (S1017, S1018). That color-adjusted video signal is then processed in the video recording portion 107 and recorded to the recording medium 109 via the video medium interface portion 108 (S806). Here, the recording medium conforms to the xvYCC color space and thus color compression processing is not performed.

If the color gamut of one frame of the input signal that is determined in S1012 is not in the xvYCC color space and the video signal has a narrow color gamut, then the color adjustment parameter revision portion 904 determines the color adjustment parameter and performs color adjustment on the video signal based on that color adjustment parameter (S1014, S1015), and then processing for expanding the color gamut toward the xvYCC color space is performed (S1016). The video signal is then processed in the video recording portion 107 and recorded to the recording medium 109 via the video medium interface portion 108 (S805). In this case as well, the recording medium conforms to the xvYCC color space and thus color compression processing is not performed.

The processing from S1012 is continued until all frames are processed (S806).

Then, based on the processing that has been performed, the CS information, the IST information, and the CMP information (color compression factor n (n<1) if color compression has been performed, and 0 if color compression is not performed) are each recorded to the recording medium (S807, S808, S1011).

Thus, changing processing such as color adjustment and color expansion based on the color gamut of the video signal allows color signal processing that uses the xvYCC color space to be performed, regardless of the nature of the video signal. Moreover, even if the recording medium is a conventional medium that conforms to YCbCr, the color compression processing allows for recording of a video signal that has been subjected to color adjustment in the xvYCC color space.

Figure 12:
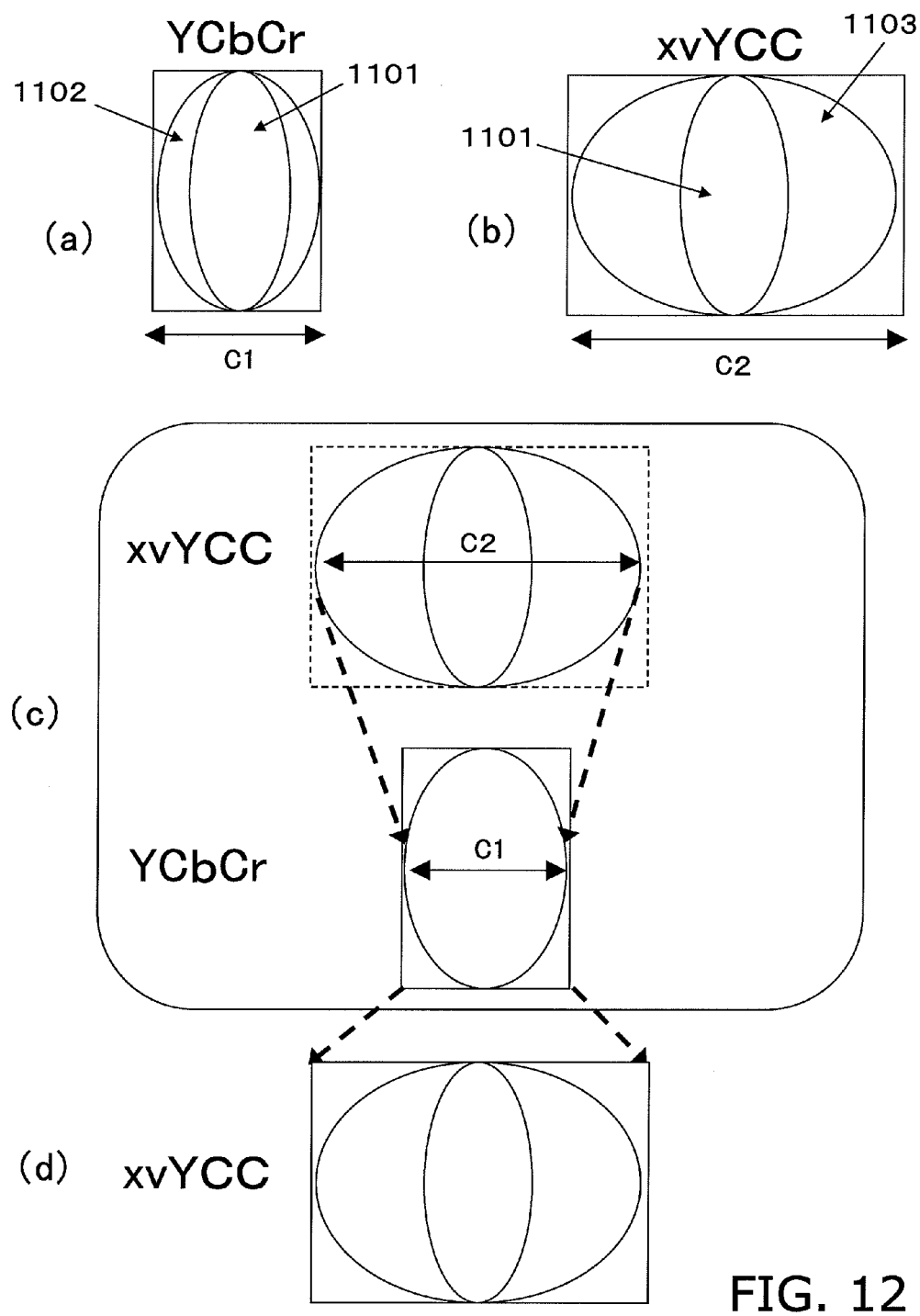
FIG. 12 is an explanatory diagram of the processing of the video signal processing device according to the second embodiment of the invention.

Next, FIG. 12 is used to describe the general concept of color gamut expansion and color compression as means for "preferable image creation" that involves color extension in this embodiment.

FIGS. 12(*a*) and (*b*) show expansion of the color gamut corresponding to the first embodiment. A color gamut 1101 of an original image is subjected to color gamut expansion targeting both the conventional YCbCr color space and the wider xvYCC color space, resulting in 1102 and 1103. Here, although the degree of color adjustment is of course different between the two, the concept of color compression is not present.

FIGS. 12(*c*) and (*d*) illustrate color gamut expansion and compression, corresponding to the case of the second embodiment in which both color expansion and color compression are performed. The case of recording to a recording medium that conforms to the conventional YCbCr color space is described. As for the extent of color gamut expansion, a xvYCC color space is the target like in FIG. 12(*b*), but because the recording medium that can be actually be recorded to is for video signals in the conventional YCbCr color space, color compression is performed once just for the sake of recording. This compression ratio CMP is n, and can be represented by the following formula using C1 and C2, which express the chroma ranges of the conventional YCbCr color space and the xvYCC color space.

[Eq. 5]

$$n = C1/C2 (<1) \quad \text{(Formula 5)}$$

FIG. 12(*d*) shows the processing for reproducing the recorded video, in which the video can be reproduced at a color gamut that corresponds to the original color gamut, based on the CMP information that is recorded along with the video. Tone degradation occurs due to quantization during compression, but the characteristics of human vision do not allow us to perceive tone degradation in the chroma direction as well as in the luminance direction, and thus in practical terms, often it is the case that tone degradation is not a problem.

Figure 13:
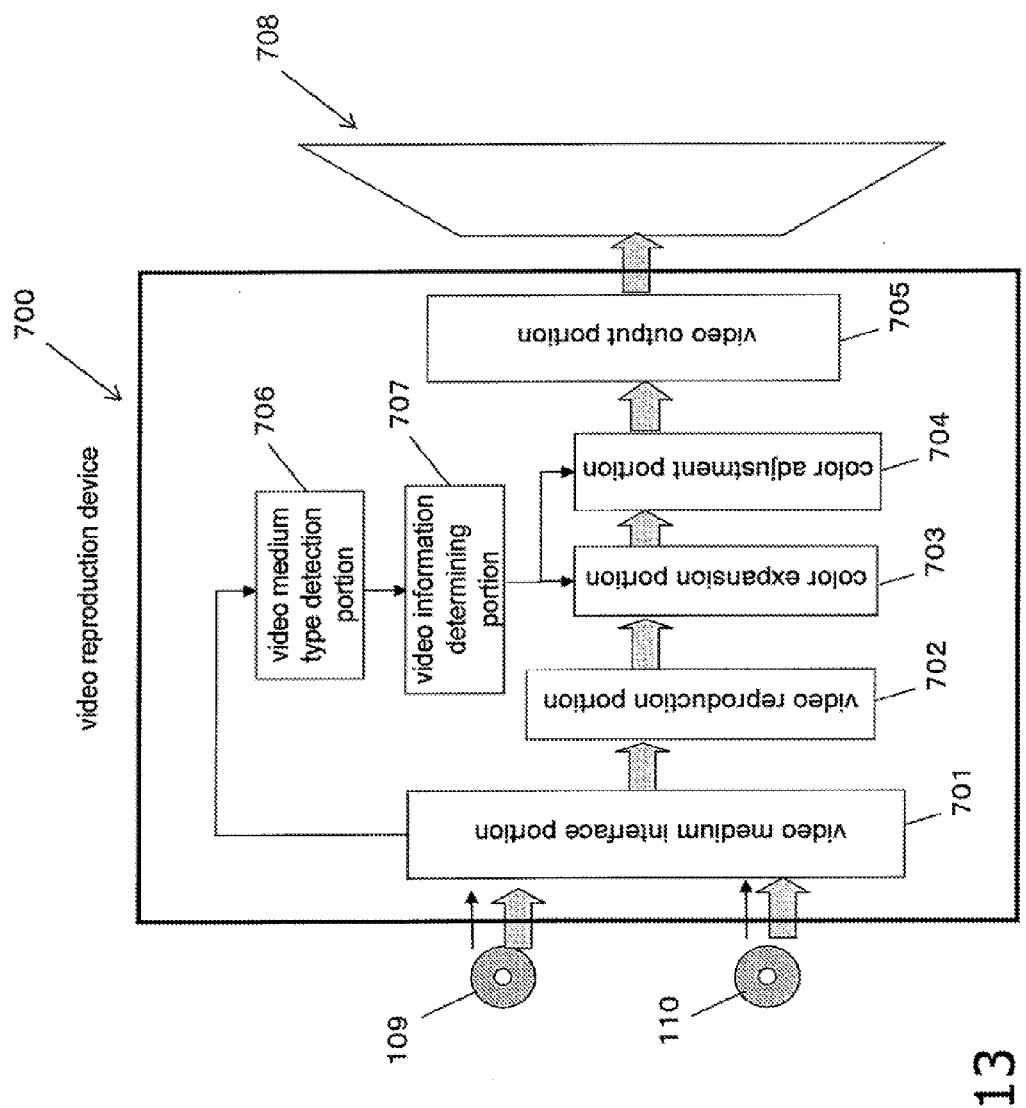
FIG. 13 is an overall view of the configuration of the video reproduction device for reproducing the recording media of the video signal processing device of the second embodiment of the invention.
Figure 14:
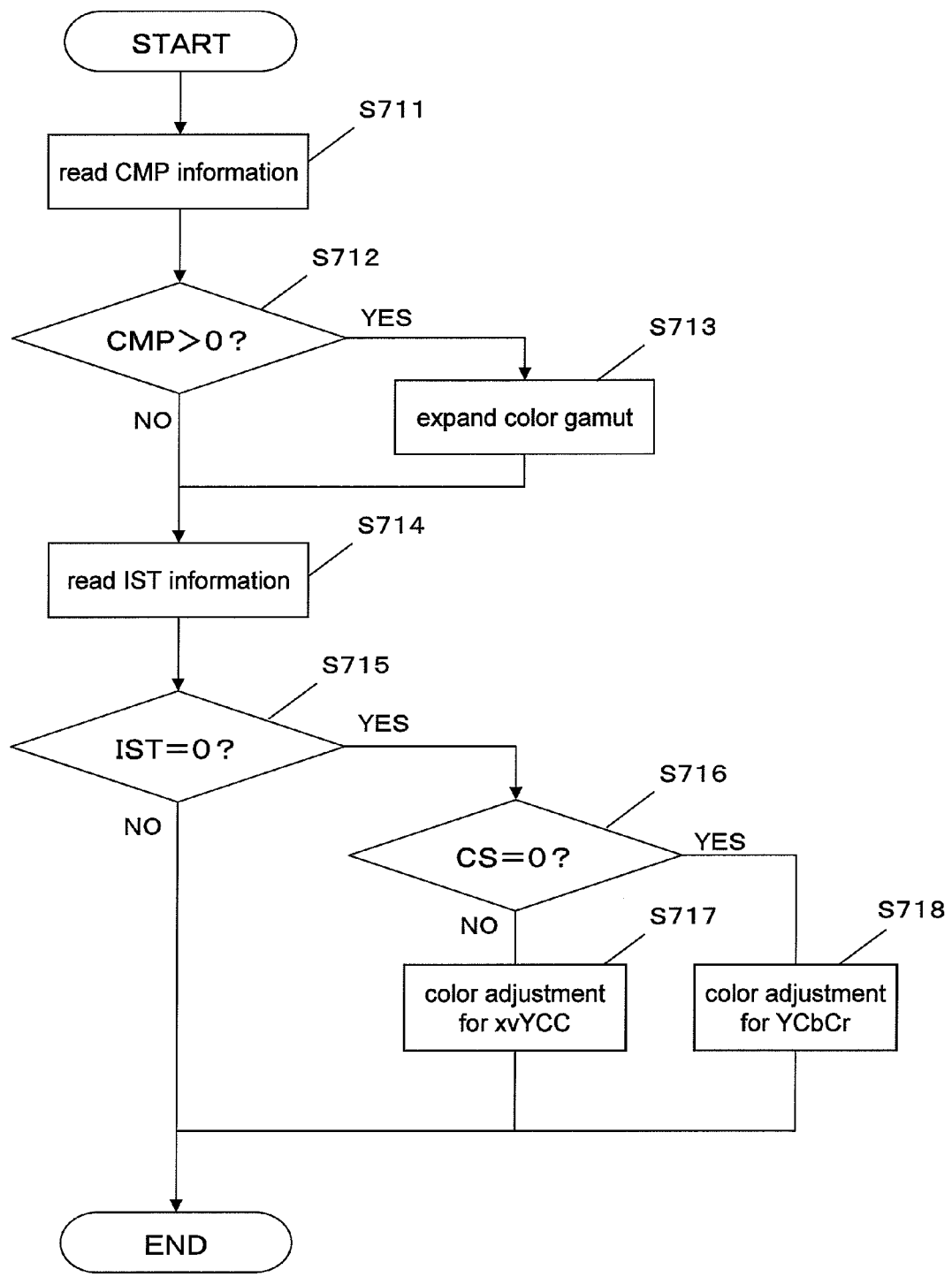
FIG. 14 is a flowchart of the processing of the video reproduction device for reproducing the recording media of the video signal processing device of the second embodiment of the invention.

FIG. 13 is the overall configuration of a video signal reproduction device 700 for reproducing the recording media 109 and 110 on which a video signal has been recorded by the video signal processing device 100' of this embodiment. The operation of the video signal reproduction device 700 is described using FIG. 13 and FIG. 14. It should be noted that reference numeral 708 denotes a display device.

A video reproduction portion 702 reproduces the video signal by reading out, via an video medium interface portion 701, signals that have been subjected to encoding, video compression, and recording encoding, for example, and recorded to the recording media 109 and 110, and performing processing such as decoding.

A video medium type detection portion 706 determines whether the recording medium has been recorded with a video signal that conforms to the xvYCC color space or has been recorded with a video signal that conforms to the conventional YCbCr color space. This determination is made based on whether CS information, IST information, and CMP information, for example, are present on the recording medium, and if none of this information is present, then it is determined that the medium conforms to the conventional YCbCr color space.

Next, if CS information, for example, is present on the recording medium, then a video information determining portion 707 obtains that CS information, IST information, and CMP information (S711). A color expansion portion 703 and a color adjustment portion 704 perform the processing that corresponds with their function, based on the information that has been obtained by the video information determining portion 707, on the video signal that is reproduced by the video reproduction portion 702. A CMP information of 1 (S712) indicates that color gamut compression has occurred in the recording system, and thus color gamut expansion is performed by the color expansion portion 703 (S713). A CMP information of 0 (S712) indicates that color gamut compression has not occurred in the recording system, and thus color gamut expansion is not performed by the color expansion portion 703 and IST information is read (S714). IST information of 1 indicates that color adjustment occurred in the recording system, and thus performing additional color adjustment in the reproduction system would result in too much color adjustment, and therefore color adjustment is not performed in the reproduction system (S715). In other words, in this case, the color adjustment portion 704 does not perform color adjustment. IST information of 0 indicates that color adjustment has not occurred in the recording system, and thus color adjustment occurs in the reproduction system (S715). In other words, in this case, the color adjustment portion 704 performs color adjustment (S716 to S718). At this time, the color adjustment portion 704 determines whether to perform color adjustment for the conventional YCbCr color space or to perform color adjustment for the xvYCC color space based on the CS information. If the CS information is 1, then the color adjustment portion 704 performs color adjustment for the xvYCC color space (S717), whereas if the CS information is 0, then the color adjustment portion 704 performs color adjustment for the conventional YCbCr color space (S718). The output of the color adjustment portion 704 is received by the video output portion 705 for output to the display device 708.

It should be noted that processing in which IST information, CMP information, and CS information are used has been described, but it is not always necessary to perform processing using all three of these information types, and it is also possible to perform processing using any one or two of these types of information.

As illustrated above, it is possible to exchange and ascertain IST information, CMP information, and CS information between the recording system and the reproduction system, and thus it is possible to prevent double color adjustment, for example, in the recording system and the reproduction system. Further, by the video signal processing device 100' according to the second embodiment of the invention recording a video signal that has been compressed to within the conventional YCbCr color space, as shown in FIG. 12(c), to the recording medium, the color reproduced even with a conventional reproduction device, with which processing such as color adjustment and color expansion of the recording medium cannot be performed in the reproduction system, without causing side effects such as massive color squashing. In other words, the ability to be reproduced by conventional devices is retained, while it is possible to reliably reproduce the colors of a wider color gamut without over-adjusting, for example, with reproduction devices like that shown in FIG. 13 that are capable of color expansion and color adjustment.

Third Embodiment

Next, the video signal processing device according to a third embodiment is described.

The video signal processing device according to the third embodiment differs from the video signal processing device 100 according to the first embodiment in that the video color adjustment portion 102 has been replaced with a video color adjustment portion 102', and aside from that, it is the same as the video signal processing device 100 according to the first embodiment. It should be noted that the overall configuration of the video signal processing device according to the third embodiment is the same as that of the video signal processing device 100 according to the first embodiment, and thus description thereof is omitted.

Figure 15:
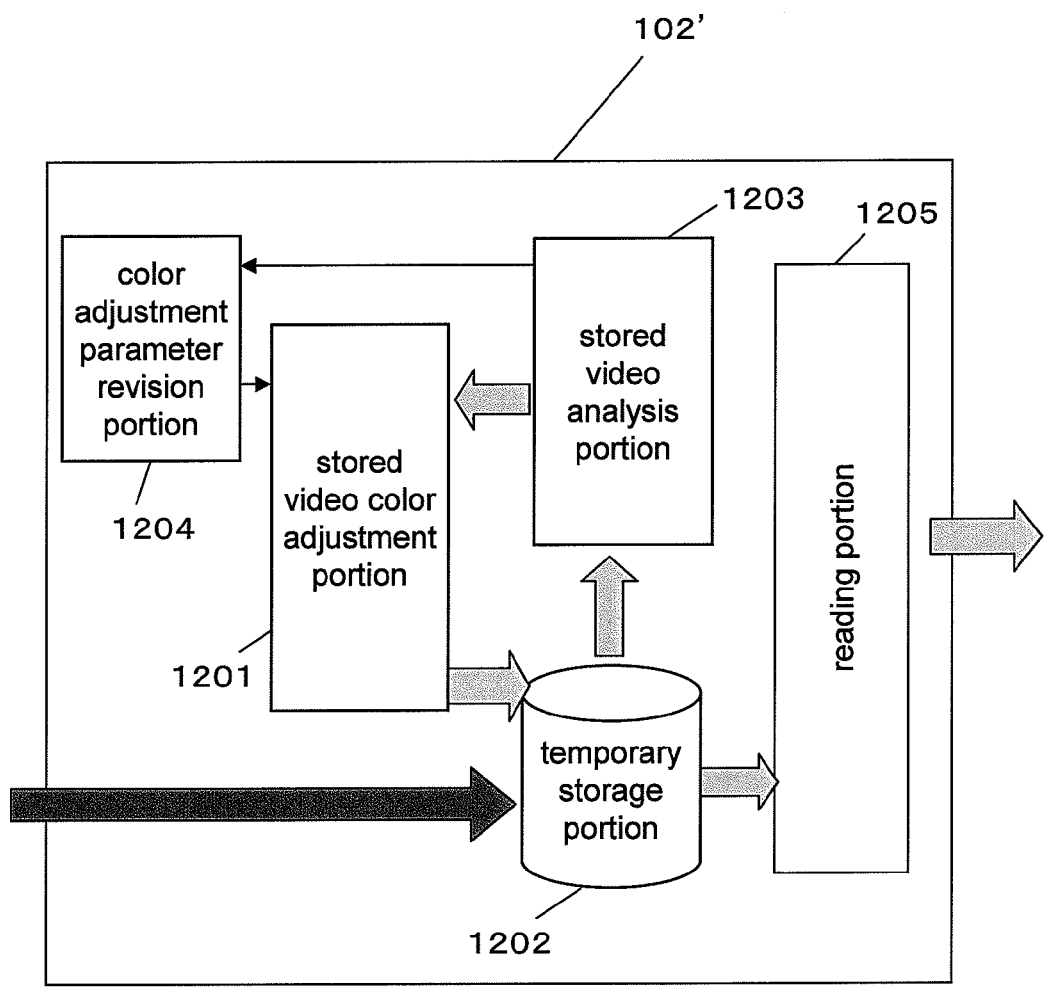
FIG. 15 is a diagram of the overall configuration of the color adjustment portion of the video signal processing device according to the third embodiment of the invention.

FIG. 15 shows the overall configuration of the video color adjustment portion 102' of the video signal processing device 100 according to the third embodiment of the invention. The video color adjustment portion 102' differs from the video color adjustment portion 102 of FIG. 1 in that it stores and processes video signals.

For example, with the video signal processing device according to the third embodiment, when capturing video the video signal is not color adjusted in real time but instead first, one whole sequence of the video signal is stored in a temporary storage portion 1202 that is made of a hard disc or a semiconductor memory. Then, after video capturing is over, a stored video analysis portion 1203 analyzes temporal changes in the video color gamut over the entire sequence of the video signal stored on the temporary storage portion 1202.

A color adjustment parameter revision portion 1204 receives the result of this analysis, and changes the color adjustment parameter. Based on this changed adjustment parameter, a stored video color adjustment portion 1201 executes color adjustment on the whole sequence of video, and then again stores this in the temporary storage portion 1202. This process can be repeated again, allowing optimal color adjustment to be executed on the entire video as frequently as desired, so long as the original video is not broken. When it is determined that color adjustment is optimal, a reading portion 1205 reads the color-adjusted video from the temporary storage portion 1202 and outputs it.

Figure 16:
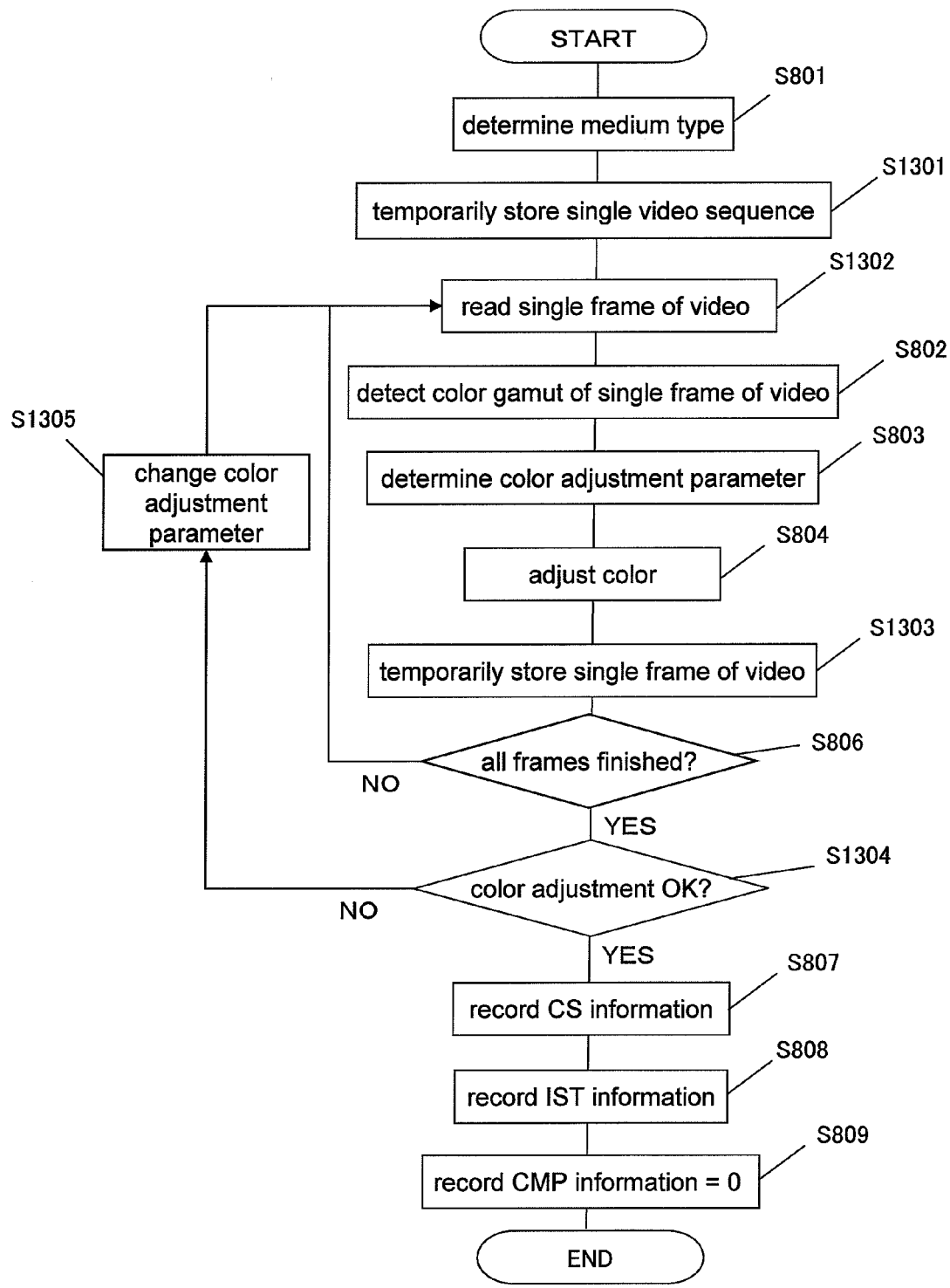
FIG. 16 is a flowchart of the processing of the video signal processing device according to the third embodiment of the invention.

FIG. 16 is a flowchart of the processing according to this embodiment, and differs from that of the first embodiment by S1301 to S1305. When recording is started by the video signal processing device 100' (a camera, for example), first, the recording medium type is detected in S801 and the CS (Color Space) information is determined. In S1301, a continuous video sequence is stored temporarily. In S1302, a single frame of the video signal is read out and the color gamut of that single frame of the video signal is detected in S802. In S803, a color adjustment parameter that leads to the target color distribution is determined. In S804, actual color adjustment is executed on the single frame of video. In S1303, the adjusted single frame of video is stored temporarily. In S806, it is determined whether or not all frames of the sequence of the video signal have been processed, and if not yet finished, then the procedure is returned to S1302. Next, in S1304, the single sequence of video for which color adjustment is finished is evaluated. Here, it is determined whether or not there is anything unnatural in the temporal changes in the color of the overall video, for example, and if additional revision is to be performed, then in S1305 the color adjustment parameter is changed, and the procedure is returned to S1302. If color adjustment is over, then in S807, CS information or 0 or 1 (conventional YCbCr color space or xvYCC color space) is recorded, and in S808, IST information of 1 (yes adjustment) is recorded. Further, in S809, a CMP of 0 is recorded because color gamut compression was not performed at the time of recording.

It should be noted that in this invention, video, by which is meant a moving picture, is the primary object that is treated, but it is also possible to handle still images as well, particularly in instances where the problem is other than an issue with the chronological order.

Other Embodiments

It should be noted that in the video signal processing devices described in the foregoing embodiments, the blocks can be independently processed into single chips, or into single chips that include some or all of the blocks, through a semiconductor device such as an LSI.

It should be noted that here an LSI is adopted, but depending on differences in the degree of integration, it may be referred to as an IC, system LSI, super LSI, or ultra LSI.

The method of circuit integration is not limited to LSI, and it is also possible to realize a dedicated circuit or a generalized processor. After LSI fabrication, it is possible to employ a programmable FPGA (Field Programmable Gate Array) or a reconfigurable processor in which the connections and settings of the circuit cells within the LSI can be reconfigured.

Further, if other technologies that improve upon or are derived from semiconductor technologies present integration technology that supplants LSI, then naturally it is also possible to integrate the functional blocks using that technology. Biotechnology applications are one foreseeable example.

The various processes of the embodiments can be achieved by hardware or software. They also can be achieved by a mixture of processing by hardware and software.

It should be noted that the specific configuration of the invention is not limited to the embodiments discussed above, and various modifications and revisions are possible within a scope that does not deviate from the gist of the invention.

INDUSTRIAL APPLICABILITY

The video signal processing device of the invention realizes novel processing relating to color signal processing of a video signal, and thus is useful in industrial fields related to video devices, and the video signal processing device of the invention can be implemented in these fields.

The invention claimed is:

1. A video signal processing device comprising:
a video color gamut obtaining block operable to obtain a color gamut of a video signal from the video signal;
a color adjustment block operable to perform color adjustment on the video signal, based on the color gamut of the video signal that is obtained by the video color gamut obtaining block;
a color adjustment information output block operable to output information on the color adjustment that is performed by the color adjustment block; and
a recording medium type detection block operable to detect a medium type of a recording medium for recording the video signal,
wherein the color adjustment block performs the color adjustment for compressing or expanding the color gamut, based on the color gamut of the video signal that is obtained by the video color gamut obtaining block and based on the medium type of the recording medium that is detected by the recording medium type detection block, and
wherein the recording medium type detection block detects the medium type of the recording medium by determining whether or not the recording medium is compatible with an extended color space.

2. The video signal processing device according to claim 1, wherein the video color gamut obtaining block obtains a range of the color gamut of the video signal; and
wherein the color adjustment block performs the color adjustment based on the range of the color gamut.

3. The video signal processing device according to claim 1, wherein the color adjustment block performs the color adjustment on the video signal by expanding a first color space that is determined from the color gamut of the video signal to either one of a second color space that has a wider color gamut than the first color space or a third color space that is wider than the second color space, based on the color gamut and the medium type.

4. The video signal processing device according to claim 3, wherein the first color space is a YCbCr color space or an xvYCC color space.

5. The video signal processing device according to claim 1, wherein the color adjustment block comprises:
a color space selection block operable to select a target color space for adjusting a color of the video signal, based on the medium type of the recording medium;
a color expansion block operable to expand the color gamut of the video signal within the target color space selected by the color space selection block, with an expansion ratio that is determined based on the medium type and the color gamut of the video signal that is obtained by the video color gamut obtaining block; and
a color compression block operable to compress the color gamut of the video signal that has been expanded by the color expansion block, with a compression ratio that is determined based on the medium type and the color gamut of the video signal that has been processed by the color expansion block.

6. The video signal processing device according to claim 1, wherein the color adjustment block comprises:
a storage portion operable to store a predetermined amount of the video signal;
an analysis portion operable to analyze temporal changes in the color gamut of the predetermined amount of the video signal that is stored in the storage portion; and
a predetermined amount color adjustment portion operable to perform the color adjustment on the predetermined amount of the video signal that is stored, based on a result of analysis by the analysis portion.

7. The video signal processing device according to claim 1, further comprising a video information writing block,
wherein the video information writing block records information relating to the color adjustment that is performed by the color adjustment block to the recording medium.

8. The video signal processing device according to claim 7, wherein the video information writing block records a fact that color adjustment has been performed on the video signal by the color adjustment block, to the recording medium as information.

9. The video signal processing device according to claim 7, wherein the video information writing block records information on a target color space of the color adjustment on the video signal by the color adjustment block to the recording medium.

10. The video signal processing device according to claim 7, wherein the video information writing block records a degree of compression, in a case where the color gamut of the video signal has been compressed by the color adjustment block, as information to the recording medium.

11. A non-transitory computer-readable recording medium having:
at least a video signal recorded thereon; and
color adjustment presence information recorded thereon, the color adjustment presence information indicating whether or not color adjustment has been performed on the video signal,
wherein the color adjustment includes compressing or expanding a color gamut, based on a color gamut of the video signal and based on a detected medium type of the non-transitory computer-readable recording medium, and
wherein the medium type of the non-transitory computer-readable recording medium is detected by determining whether or not the non-transitory computer-readable recording medium is compatible with an extended color space.

12. A non-transitory computer-readable recording medium having:
at least a video signal recorded thereon; and
color adjustment target color space information recorded thereon, the color adjustment target color space information indicating a target color space for color adjustment on the video signal,
wherein the color adjustment includes compressing or expanding a color gamut, based on a color gamut of the video signal and based on a detected medium type of the non-transitory computer-readable recording medium, and
wherein the medium type of the non-transitory computer-readable recording medium is detected by determining whether or not the non-transitory computer-readable recording medium is compatible with an extended color space.

13. A non-transitory computer-readable recording medium having:
at least a video signal recorded thereon; and
color gamut compression information recorded thereon, the color gamut compression information indicating whether or not color gamut compression has been performed on a color-adjusted video signal, wherein color adjustment includes compressing or expanding a color gamut, based on a color gamut of the video signal and based on a detected medium type of the non-transitory computer-readable recording medium, and wherein the medium type of the non-transitory computer-readable recording medium is detected by determining whether or not the non-transitory computer-readable recording medium is compatible with an extended color space.

14. A video signal processing method comprising:

obtaining, via a video processing device a color gamut of a video signal;

performing, via the video processing device, color adjustment on the video signal, based on the color gamut of the video signal that is obtained in the obtaining of the color gamut;

outputting information on the color adjustment that was performed in the performing of the color adjustment; and detecting a medium type of a recording medium for recording the video signal, wherein the performing of the color adjustment includes compressing or expanding the color gamut, based on the color gamut of the video signal that is obtained by the obtaining of color gamut and based on the medium type of the recording medium that is detected by the detecting of the medium type, and wherein the detecting of the medium type detects the medium type of the recording medium by determining whether or not the recording medium is compatible with an extended color space.

15. A non-transitory computer-readable recording medium having a video signal processing program recorded thereon, the video signal processing program for causing a computer to function as:

a video color gamut obtaining portion operable to obtain a color gamut of a video signal;

a color adjustment portion operable to perform color adjustment on the video signal, based on the color gamut of the video signal that is obtained by the video color gamut obtaining portion;

a color adjustment information output portion operable to output information on the color adjustment that is performed by the color adjustment portion; and a recording medium type detection portion operable to detect a medium type of a recording medium for recording the video signal, wherein the color adjustment portion performs the color adjustment for compressing or expanding the color gamut, based on the color gamut of the video signal that is obtained by the video color gamut obtaining portion and based on the medium type of the recording medium that is detected by the recording medium type detection portion, and wherein the recording medium type detection portion detects the medium type of the recording medium by determining whether or not the recording medium is compatible with an extended color space.

16. An integrated circuit comprising:

a video color gamut obtaining portion operable to obtain a color gamut of a video signal;

a color adjustment portion operable to perform color adjustment on the video signal, based on the color gamut of the video signal that is obtained by the video color gamut obtaining portion;

a color adjustment information output portion operable to output information on the color adjustment that is performed by the color adjustment portion; and a recording medium type detection portion operable to detect a medium type of a recording medium for recording the video signal, wherein the color adjustment portion performs the color adjustment for compressing or expanding the color gamut, based on the color gamut of the video signal that is obtained by the video color gamut obtaining portion and based on the medium type of the recording medium that is detected by the recording medium type detection portion, and wherein the recording medium type detection portion detects the medium type of the recording medium by determining whether or not the recording medium is compatible with an extended color space.

* * * * *